(12) United States Patent
Fujimoto et al.

(10) Patent No.: US 8,717,178 B2
(45) Date of Patent: May 6, 2014

(54) INFORMATION PROCESSING APPARATUS AND COMPUTER READABLE MEDIUM

(75) Inventors: Masakazu Fujimoto, Tokyo (JP); Satomi Mizuno, Kanagawa (JP); Kenzo Mikamoto, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 204 days.

(21) Appl. No.: 13/019,010

(22) Filed: Feb. 1, 2011

(65) Prior Publication Data
US 2012/0038481 A1 Feb. 16, 2012

(30) Foreign Application Priority Data

Aug. 13, 2010 (JP) .................................. 2010-181387

(51) Int. Cl.
*G08B 23/00* (2006.01)
(52) U.S. Cl.
USPC ................... 340/573.1; 340/572.1; 340/572.3; 340/572.2; 340/572.5; 340/572.6; 340/572.7; 340/572.8; 340/572.9; 705/500; 705/50
(58) Field of Classification Search
USPC ....................................................... 340/573.1
See application file for complete search history.

(56) References Cited

U.S. PATENT DOCUMENTS

| 1,689,227 | A | * | 10/1928 | Burrell ......................... 200/85 A |
| 2001/0018660 | A1 | * | 8/2001 | Sehr .................................. 705/5 |
| 2010/0094467 | A1 | | 4/2010 | Kakiuchi | |

FOREIGN PATENT DOCUMENTS

| JP | 2002-295885 | A | | 10/2002 |
| JP | 2006-302137 | A | | 11/2006 |
| JP | 2006302137 | A | * | 11/2006 |
| JP | 4188723 | B2 | * | 11/2008 |
| JP | 2010-098401 | A | | 4/2010 |
| JP | 201 1-1 651 22 | A | | 8/2011 |
| JP | 2012-043043 | A | | 3/2012 |
| WO | WO 2008092366 | A1 | * | 8/2008 |

OTHER PUBLICATIONS

Office Action, dated Feb. 25, 2014, issued by the Japanese Patent Office in counterpart Japanese Patent Application No. 2010-181387.

* cited by examiner

*Primary Examiner* — George Bugg
*Assistant Examiner* — Anthony D Afrifa-Kyei
(74) *Attorney, Agent, or Firm* — Sughrue Mion, PLLC

(57) ABSTRACT

An information processing apparatus includes an entrance and exit detection module, an organization information obtaining module, a user number calculation module, a seat determination module and a presentation module. The entrance and exit detection module detects a user's entrance and exit to and from a room. The organization information obtaining module obtains user information representative of a user belonging to an organization using the room by using organization user information storing organization information representative of the organization and the user information representative of the user belonging to the organization. The user number calculation module calculates the number of users of the organization using the room. The seat determination module associates with each other the organization information representative of the organization and seat information representative of seats in the room, and determines a seat for the user whose entrance is detected. The presentation module presents the determined seat.

12 Claims, 22 Drawing Sheets

FIG. 2

| SEAT ID | SEAT POSITION |
|---------|---------------|
| Z-1 | (x11, y11), (x12, y12) |
| Z-2 | (x21, y21), (x22, y22) |
| Z-3 | (x31, y31), (x32, y32) |
| ⋮ | ⋮ |

FIG. 3

| SEAT ID | MEMBER ID |
|---------|-----------|
| Z-1 | M-11 |
| Z-2 | M-1 |
| Z-3 | — |
| ⋮ | ⋮ |

FIG. 4

| AREA ID | AREA POSITION |
|---------|---------------|
| R-A | (xA1, yA1), (xA2, yA2) |
| R-B | (xB1, yB1), (xB2, yB2) |
| R-C | (xC1, yC1), (xC2, yC2) |
| ⋮ | ⋮ |

FIG. 5

| AREA ID | USE CONDITION |
|---|---|
| R-A | ON |
| R-B | OFF |
| R-C | OFF |
| ... | ... |

| AREA ID | SEAT ID |
|---|---|
| R-A | Z-1, Z-2, Z-3, Z-4, Z-5, Z-6, Z-7, Z-8, Z-9 |
| R-B | Z-10, Z-11, Z-12, Z-13, Z-14, Z-15, Z-16, Z-17, Z-18, Z-19, Z-20, Z-21 |
| R-C | Z-22, Z-23, Z-24, Z-25, Z-26, Z-27, Z-28, Z-29, Z-30 |
| R-D | Z-31, Z-32, Z-33, Z-34, Z-35, Z-36, Z-37, Z-38, Z-39 |
| R-E | Z-40, Z-41, Z-42, Z-43, Z-44, Z-45, Z-46, Z-47, Z-48, Z-49, Z-50, Z-51 |
| R-F | Z-52, Z-53, Z-54, Z-55, Z-56, Z-57, Z-58, Z-59, Z-60 |

600, 610, 620

| ORGANIZA-TION ID | MEMBER ID |
|---|---|
| S-A | M-1, S-B, S-C, S-D |
| S-B | S-E, S-F |
| S-C | M-3, S-G |
| S-D | M-2, M-6, M-7 |
| S-E | M-8, M-9, M-10 |
| S-F | M-4, M-11, M-12 |
| S-G | M-5, M-13, M-14 |
| : | : |

1110 — ORGANIZATION ID column
1120 — MEMBER ID column
1100 — table

FIG. 12

| MEMBER ID (1210) | DATE (1220) | AREA ID (1230) |
|---|---|---|
| M-1 | 2010/3/11 8:07:25 | 192.168.001.001 |
| M-3 | 2010/3/11 8:07:25 | 192.168.001.010 |
| : | : | : |
| M-1 | 2010/3/11 8:07:30 | 192.168.001.001 |
| : | : | : |

| TIME PERIOD (1310) | SUN (1320) | MON (1330) | TUE (1340) | WED (1350) | THU (1360) | FRI (1370) | SAT (1380) |
|---|---|---|---|---|---|---|---|
| : | : | : | : | : | : | : | : |
| 8:00 | 0 | 0 | 0 | 2 | 1 | 0 | 0 |
| 9:00 | 0 | 18 | 21 | 20 | 23 | 20 | 1 |
| 10:00 | 0 | 19 | 21 | 20 | 16 | 22 | 3 |
| 11:00 | 0 | 23 | 22 | 16 | 12 | 21 | 4 |
| 12:00 | 0 | 3 | 8 | 2 | 10 | 6 | 4 |
| 13:00 | 0 | 15 | 19 | 18 | 15 | 14 | 3 |
| : | : | : | : | : | : | : | : |

1300

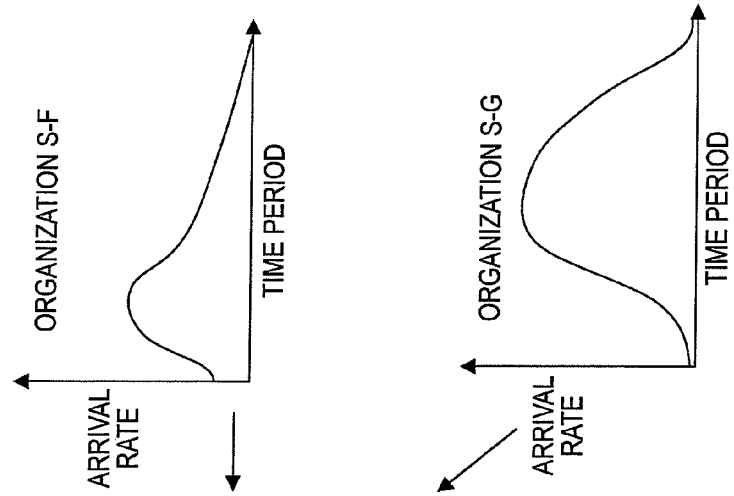
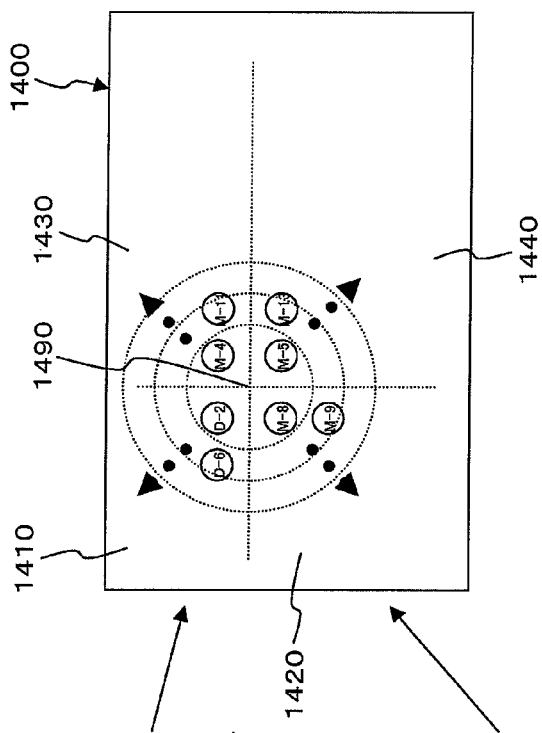
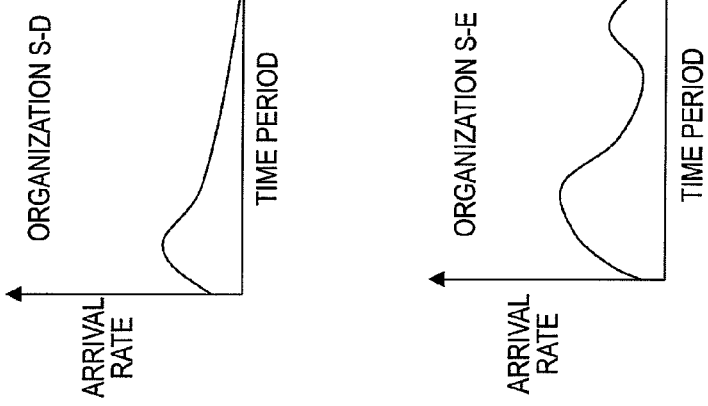

FIG. 17

Table 1700:

| TIME PERIOD | SUN (1710) | MON (1720) | TUE (1730) | WED (1740) | THU (1750) | FRI (1760) | SAT (1770/1780) |
|---|---|---|---|---|---|---|---|
| ⋮ | ⋮ | ⋮ | ⋮ | ⋮ | ⋮ | ⋮ | ⋮ |
| 8:00 | 0/26 | 0/26 | 0/26 | 2/26 | 1/26 | 0/26 | 0/26 |
| 9:00 | 0/26 | 18/26 | 21/26 | 20/26 | 23/26 | 20/26 | 1/26 |
| 10:00 | 0/26 | 19/26 | 21/26 | 20/26 | 16/26 | 22/26 | 3/26 |
| 11:00 | 0/26 | 23/26 | 22/26 | 16/26 | 12/26 | 21/26 | 4/26 |
| 12:00 | 0/26 | 3/26 | 8/26 | 2/26 | 10/26 | 6/26 | 4/26 |
| 13:00 | 0/26 | 15/26 | 19/26 | 18/26 | 15/26 | 14/26 | 3/26 |
| ⋮ | ⋮ | ⋮ | ⋮ | ⋮ | ⋮ | ⋮ | ⋮ |

FIG. 18

Table 1800:

| TIME PERIOD | SUN (1810) | MON (1820) | TUE (1830) | WED (1840) | THU (1850) | FRI (1860) | SAT (1870/1880) |
|---|---|---|---|---|---|---|---|
| ⋮ | ⋮ | ⋮ | ⋮ | ⋮ | ⋮ | ⋮ | ⋮ |
| 8:00 | 0/26 | 0/26 | 0/26 | 15/26 | 0/26 | 0/26 | 0/26 |
| 9:00 | 0/26 | 11/26 | 17/26 | 19/26 | 18/26 | 12/26 | 0/26 |
| 10:00 | 0/26 | 14/26 | 18/26 | 21/26 | 17/26 | 23/26 | 0/26 |
| 11:00 | 0/26 | 20/26 | 18/26 | 15/26 | 19/26 | 23/26 | 1/26 |
| 12:00 | 0/26 | 5/26 | 6/26 | 4/26 | 6/26 | 14/26 | 2/26 |
| 13:00 | 0/26 | 21/26 | 17/26 | 14/26 | 21/26 | 22/26 | 2/26 |
| ⋮ | ⋮ | ⋮ | ⋮ | ⋮ | ⋮ | ⋮ | ⋮ |

INFORMATION PROCESSING APPARATUS AND COMPUTER READABLE MEDIUM

CROSS-REFERENCE TO RELATED APPLICATIONS

This application is based upon and claims priority under 35 USC 119 from Japanese Patent Application No. 2010-181387, filed Aug. 13, 2010.

BACKGROUND

Technical Field

The present invention relates to an information processing apparatus and a computer readable medium.

SUMMARY OF THE INVENTION

According to an aspect of the invention, an information processing apparatus includes an entrance and exit detection module, an organization information obtaining module, a user number calculation module, a seat determination module and a presentation module. The entrance and exit detection module detects a user's entrance and exit to and from a room. The organization information obtaining module, in a case where a user's entrance to a room is detected by the entrance and exit detection module, when the entering user is a user who enters the room first, obtains user information representative of a user belonging to an organization using the room by using organization user information storing, in a state of being associated with each other, organization information representative of the organization and the user information representative of the user belonging to the organization. The user number calculation module calculates the number of users of the organization using the room, based on information on a past action of the user represented by the user information obtained by the organization information obtaining module. The a seat determination module associates with each other the organization information representative of the organization and seat information representative of seats in the room used by the organization based on the number of users calculated by the user number calculation module, and that determines, from among the associated seats, a seat for the user whose entrance is detected by the entrance and exit detection module. The presentation module presents the seat determined by the seat determination module, to the user whose entrance is detected by the entrance and exit detection module.

BRIEF DESCRIPTION OF THE DRAWINGS

Exemplary embodiments of the invention will be described in detail based on the following figures, wherein:

FIG. 2 is an explanatory view showing an example of the data structure of a seat position table;

FIG. 3 is an explanatory view showing an example of the data structure of a seat-member table;

FIG. 4 is an explanatory view showing an example of the data structure of an area position table;

FIG. 5 is an explanatory view showing an example of the data structure of an area-condition table;

FIG. 6 is an explanatory view showing an example of the data structure of an area-seat table;

FIG. 12 is an explanatory view showing an example of the data structure of an action log table;

FIG. 13 is an explanatory view showing an example of the data structure of a seat occupation statistic table;

FIGS. 14A to 14E are explanatory views showing an example of the relationship between the arrival rate and seats of each organization;

FIG. 17 is an explanatory view showing an example of the data structure of a seat occupation statistic table;

FIG. 18 is an explanatory view showing an example of the data structure of a seat occupation statistic table;

DETAILED DESCRIPTION

Hereinafter, examples of various exemplary embodiments suitable in implementing the present invention will be described based on the drawings.

Figure 1:
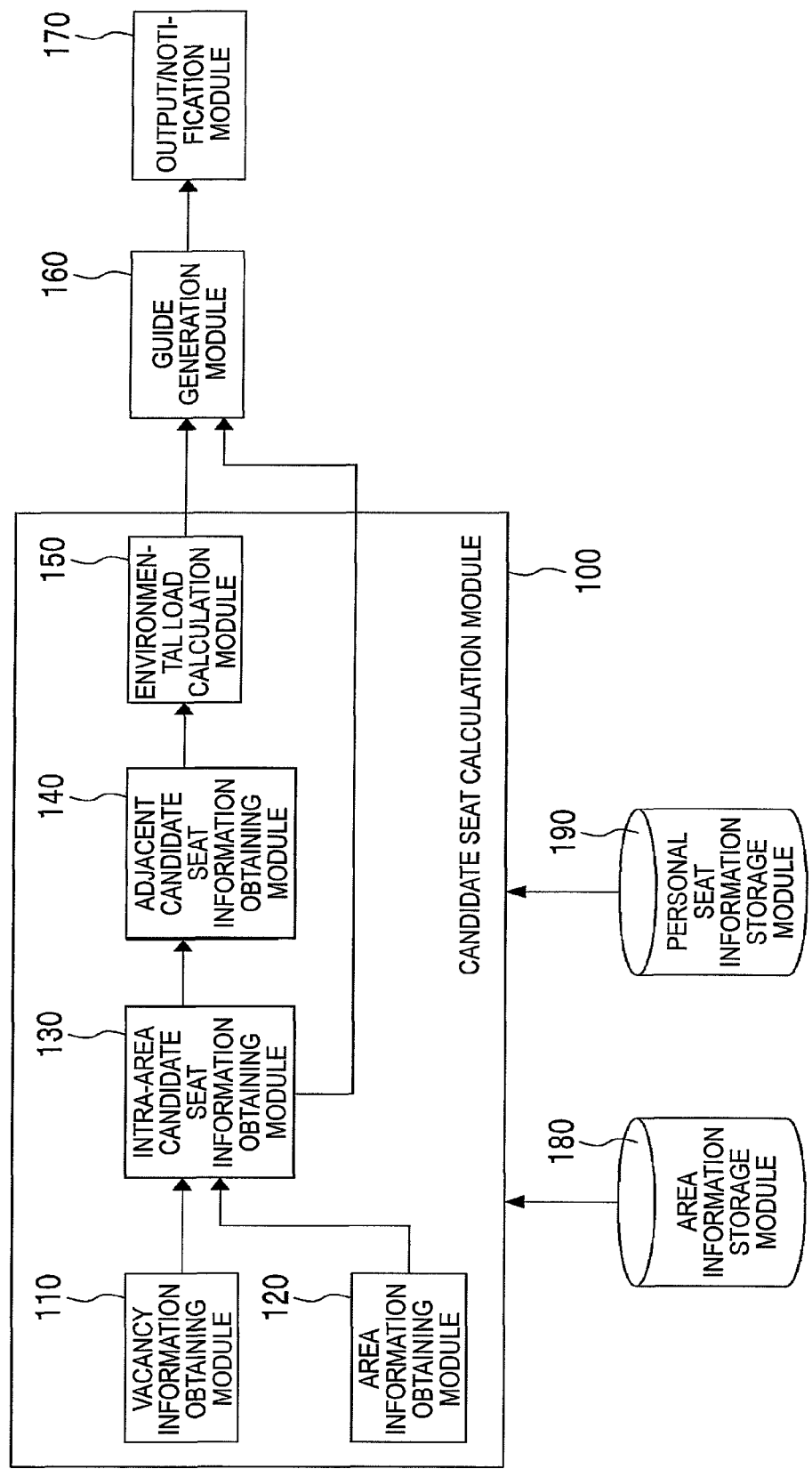
FIG. 1 is a conceptual module block diagram with respect to a structure example of a first exemplary embodiment.

FIG. 1 is a conceptual module block diagram with respect to a structure example of a first exemplary embodiment.

A module generally refers to a logically separable part such as software (computer program) or hardware. Therefore, the modules in the present exemplary embodiment refer not only to modules in computer programs but also to modules in hardware structures. Therefore, the description of the present exemplary embodiment is also description of a computer program for causing a computer to function as the modules (a program for causing a computer to execute the procedure of each, a program for causing a computer to function as each means, and a program for causing a computer to implement each function), a system, and a method. While "store", "stored", and a word equivalent thereto are used for convenience of explanation, these words mean, when the exemplary embodiment is a computer program, storing something in a storage device, outputting something to a storage device, or performing control so that something is stored in a storage device. While the modules may correspond to functions on a one-to-one basis, in implementation, one module may be constructed of one program, more than one module may be constructed of one program, or one module may be constructed of more than one program. Moreover, more than one module may be executed by one computer, or by computers in a distributed or parallel environment, one module may be executed by more than one computer. One module may include another module. Moreover, hereinafter, "connection" is used to mean a logical connection (data transmission and reception, instruction, reference relationship between pieces of data, etc.) as well as a physical connection. "Predetermined" refers to being determined before the processing concerned, and is used to have meanings including being determined not only before the start of processing of the present exemplary embodiment but also according to a situation or condition at that time or according to a situation or condition up to that time even after the start of the processing of the present exemplary embodiment as long as it is before the processing concerned.

Moreover, a system or an apparatus has a structure in which more than one computer, more than one piece of hardware, more than one apparatus or the like is connected by communication means such as a network (including a one-to-one correspondence communication connection), and cases are also included where a system or an apparatus is implemented by one computer, one piece of hardware, one apparatus or the like. "Apparatus" and "system" are used as words synonymous with each other. It is to be noted that "system" does not include one that is merely a social "scheme" (social system) which is an artificial arrangement.

When more than one processing is performed for the processing of each module or in a module, for each processing, the information concerned is read from a storage device and processed, and then, the result of the processing is written to the storage device. Therefore, descriptions are sometimes omitted of the reading from the storage device before the processing and the writing to the storage device after the processing. The storage device referred to here may include hard disks, RAMs (random access memories), external storage media, storage devices through a communication line and registers in CPUs (central processing units).

An information processing apparatus as the first exemplary embodiment is provided with, as shown in the example of FIG. 1, a candidate seat calculation module 100, a guide generation module 160, an output/notification module 170, an area information storage module 180, and a personal seat information storage module 190. The environmental load is reduced by using local air conditioning or lighting in accordance with an area where air conditioning or lighting is adjustable. A user will be sometimes referred to as a member, an entering person, or the like according to the context. The room concerned may be an office, an office for rent, a classroom, or the like.

The area information storage module 180 is provided with a storage device, and is connected to the candidate seat calculation module 100. The area information storage module 180 stores area position information storing positions of an area. An example of the area position information is an area position table 400. FIG. 4 is an explanatory view showing an example of the data structure of the area position table 400. The area position table 400 has an area ID column 410 and an area position column 420. The area ID column 410 stores area information representative of an area. The area position column 420 stores positions of an area in a room (for example, when positions in a room are represented by x and y coordinates, the x and y coordinates of the upper right of the area and the x and y coordinates of the lower left of the area).

Moreover, the area information storage module 180 stores, in a state of being associated with each other, area condition information storing area information representative of an area where a lighting apparatus or an air conditioning apparatus is adjustable and use condition information representative of the use condition of the lighting apparatus or the air conditioning apparatus in the area.

The "area where a lighting apparatus or an air conditioning apparatus is adjustable" refers to an area where one or more than one lighting apparatus or air conditioning apparatus is provided and it is possible to turn on and off or adjust the lighting apparatus or the air conditioning apparatus independently of (irrespective of) lighting apparatuses or air conditioning apparatuses in other areas. Examples of the adjustment of the lighting apparatus include brightness adjustment and color adjustment. Examples of the adjustment of the air conditioning apparatus include temperature adjustment and air volume adjustment.

An example of the area condition information is an area-condition table 500. FIG. 5 is an explanatory view showing an example of the data structure of the area-condition table 500. The area-condition table 500 has an area ID column 510 and a use condition column 520. The area ID column 510 stores area information representative of an area. The use condition column 520 stores whether the lighting apparatus or the air conditioning apparatus provided in the area is used or not. For example, the use condition column 520 stores a result of detection of the ON/OFF of the power of the lighting apparatus or the air conditioning apparatus. In the area-condition table 500, the use condition column 520 may be provided for each lighting apparatus or air conditioning apparatus in the area.

The area information storage module 180 also stores, in a state of being associated with each other, seat area information storing the area information representative of an area and seat information representative of the seats included in the area (relationship between the area and the seats). An example of the seat area information is an area-seat table 600. FIG. 6 is an explanatory view showing an example of the data structure of the area-seat table 600. The area-seat table 600 has an area ID column 610 and a seat ID column 620. The area ID column 610 stores the area information representative of an area. The seat ID column 620 stores the seat information representative of the seats present in the area. The seat ID column 620 stores information on zero or more seats. The area-seat table 600 may be generated by using a seat position table 200 and the area position table 400. For example, the area-seat table 600 may be generated based on the inclusion relationship between the seat positions (a seat position column 220 of the seat position table 200) and the area positions (the area position column 420 of the area position table 400).

The personal seat information storage module 190 is provided with a storage device, and is connected to the candidate seat calculation module 100. The personal seat information storage module 190 stores seat position information storing positions of a seat. An example of the seat position information is the seat position table 200. FIG. 2 is an explanatory view showing an example of the data structure of the seat position table 200. The seat position table 200 has a seat ID column 210 and the seat position column 220. The seat ID column 210 stores the seat information representative of a seat. The seat position column 220 stores positions of a seat in a room (for example, when a position in a room is represented by x and y coordinates, the x and y coordinates of the upper right of the seat and the x and y coordinates of the lower left of the seat).

The personal seat information storage module 190 also stores, in a state of being associated with each other, seat vacancy information storing the seat information representative of a seat and vacancy information representative of whether the seat is vacant or not. An example of the seat vacancy information is a seat-member table 300. FIG. 3 is an explanatory view showing an example of the data structure of the seat-member table 300. The seat-member table 300 has a seat ID column 310 and a member ID column 320. The seat ID column 310 stores the seat information representative of a seat. The member ID column 320 stores user information representative of the user occupying the seat. When the seat is not vacant, the user information is stored, and when the seat is vacant, information, other than the user information, representing that the seat is vacant (for example, "-" or null) is stored.

The candidate seat calculation module 100 is connected to the area information storage module 180 and the personal seat information storage module 190, and has a vacancy information obtaining module 110, an area information obtaining module 120, an intra-area candidate seat information obtaining module 130, an adjacent candidate seat information obtaining module 140 and an environmental load calculation module 150.

The vacancy information obtaining module 110 is connected to the intra-area candidate seat information obtaining module 130. The vacancy information obtaining module 110 obtains seat information representative of a vacant seat by using the seat vacancy information stored in the personal seat information storage module 190. For example, when the seat vacancy information is the seat-member table 300 illustrated in FIG. 3, the vacancy information obtaining module 110 obtains the coordinate information stored in the seat ID column 310 in the row where "-" is stored in the member ID column 320. More than one piece of coordinate information may be obtained.

The area information obtaining module 120 is connected to the intra-area candidate seat information obtaining module 130. The area information obtaining module 120 obtains the area information representative of an area where a lighting apparatus or an air conditioning apparatus is used, by using the area condition information stored in the area information storage module 180. For example, when the area condition information is the area-condition table 500 illustrated in FIG. 5, the area information obtaining module 120 obtains the area information stored in the area ID column 510 in the row where "ON" is stored in the use condition column 520. More than one piece of area information may be obtained.

The intra-area candidate seat information obtaining module 130 is connected to the vacancy information obtaining module 110, the area information obtaining module 120, the adjacent candidate seat information obtaining module 140 and the guide generation module 160. The intra-area candidate seat information obtaining module 130 determines whether or not the vacant seat represented by the seat information obtained by the vacancy information obtaining module 110 is within the area represented by the area information obtained by the area information obtaining module 120. This determination is made, for example, by using the area-seat table 600 shown in FIG. 6 based on whether or not the seat information obtained by the vacancy information obtaining module 110 is present in the seat ID column 620 corresponding to the area information obtained by the area information obtaining module 120. Then, when it is determined that the vacant seat represented by the seat information obtained by the vacancy information obtaining module 110 is within the area represented by the area information obtained by the area information obtaining module 120 as a result of the determination, the guide generation module 160 is instructed to present the vacant seat to the user. The number of vacant seats may be more than one.

The adjacent candidate seat information obtaining module 140 is connected to the intra-area candidate seat information obtaining module 130 and the environmental load calculation module 150. When the intra-area candidate seat information obtaining module 130 determines that the vacant seat represented by the seat information obtained by the vacancy information obtaining module 110 is not within the area represented by the area information obtained by the area information obtaining module 120, the adjacent candidate seat information obtaining module 140 obtains the seat information representative of the vacant seat within an area adjacent to the area represented by the area information obtained by the area information obtaining module 120. Then, the guide generation module 160 is instructed to present the vacant seat represented by the seat information to the user. The adjacent area is obtained, for example, by using the area position table 400 shown in FIG. 4. That is, whether an area is adjacent or not is determined based on the area positions in the area position column 420. Since the seats in the adjacent area (an area where neither a lighting apparatus nor an air conditioning apparatus is used) are all vacant, any of the seats may be selected. Moreover, in the adjacent area, a seat adjacent to an area where a lighting apparatus or an air conditioning apparatus is used may be selected. As the seat adjacent to the area, the distances of the seats from the area are calculated by using the area position table 400 illustrated in FIG. 4 and the seat position table 200 illustrated in FIG. 2, and a seat the distance of which is short is selected. More than one seat may be obtained.

The environmental load calculation module 150 is connected to the adjacent candidate seat information obtaining module 140 and the guide generation module 160. The environmental load calculation module 150 calculates the environmental load when the seat represented by the seat information obtained by the adjacent candidate seat information obtaining module 140 is used. For example, the increment of power consumption due to the use of the seat compared with when a seat is used that is situated in an area not adjacent to an area where a lighting apparatus or an air conditioning apparatus is already used may be calculated, or the amount of $CO_2$ emitted due to the power consumption increase may be calculated. Then, the guide generation module 160 is instructed to present the value of the environmental load to the user. When the number of seats concerned is more than one, the environmental load may be calculated for each seat. Moreover, it may be performed to calculate the environmental load for more than one seat and pass information on a candidate with a low environmental load to the guide generation module 160.

The guide generation module 160 is connected to the intra-area candidate seat information obtaining module 130, the environmental load calculation module 150 and the output/ notification module 170. When it is determined that the vacant seat represented by the seat information obtained by the vacancy information obtaining module 110 is within the area represented by the area information obtained by the area information obtaining module 120, based on the instruction from the intra-area candidate seat information obtaining module 130, the guide generation module 160 generates a guide (specifically, a guide that recommends taking the seat) for presenting the vacant seat to the user. Moreover, the guide generation module 160 may generate a guide for presenting, to the user, the vacant seat represented by the seat information obtained by the adjacent candidate seat information obtaining module 140, based on the instruction from the adjacent candidate seat information obtaining module 140. Moreover, the guide generation module 160 may generate a guide for presenting, to the user, the value of the environmental load calculated by the environmental load calculation module 150, based on the instruction from the environmental load calculation module 150.

The output/notification module 170 is connected to the guide generation module 160. The output/notification module 170 presents the guide generated by the guide generation module 160 to the user. The presentation referred to here includes outputting the guide to a display device such as a display provided in the present exemplary embodiment and providing a notification to the user by using electronic mail or the like. For example, it may be performed to dispose a card reader, a display, and the like at an entrance of a room and provide a presentation on the display when a user holds his/her security card over the card reader.

Figure 7:
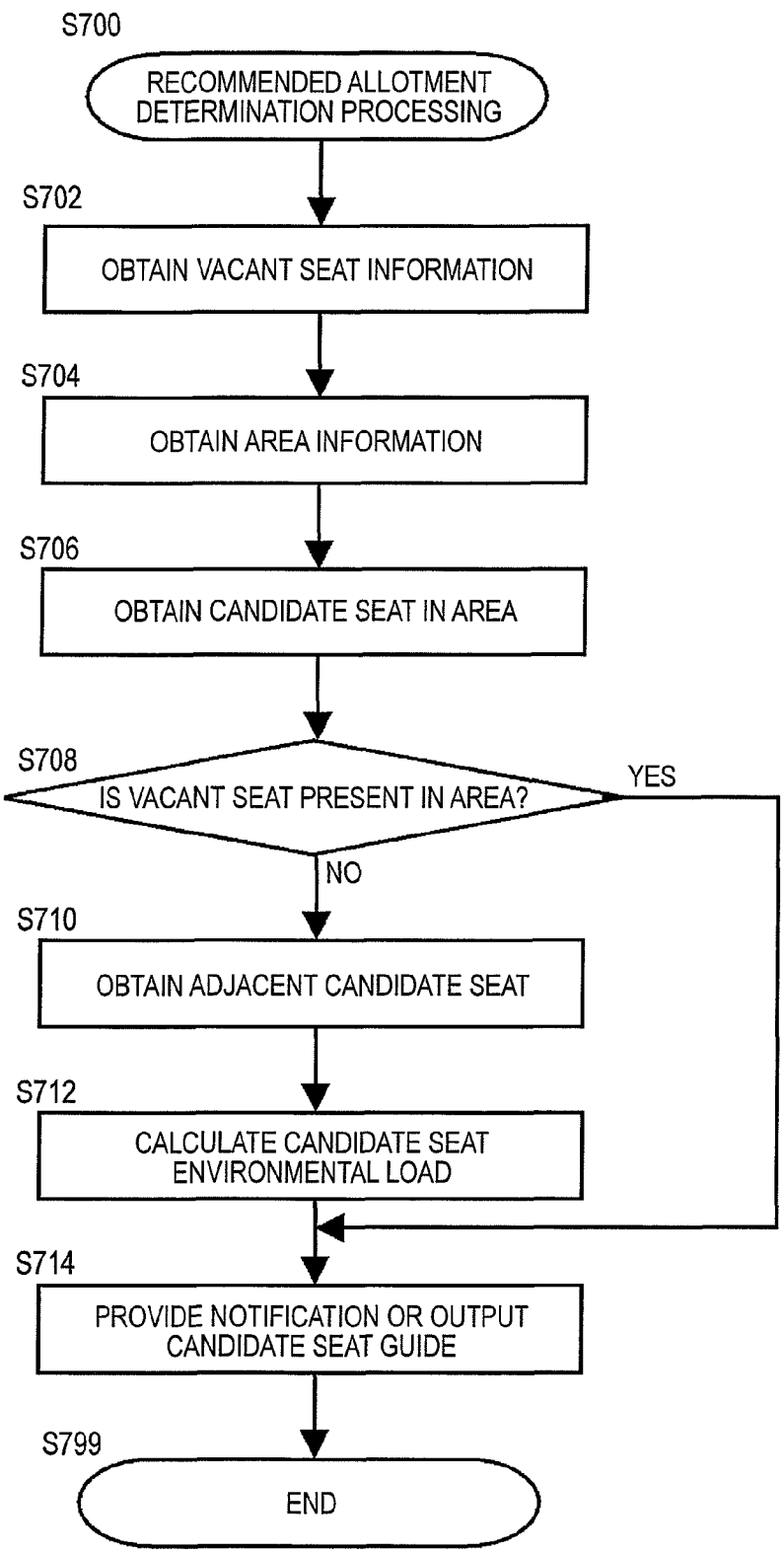
FIG. 7 is a flowchart showing an example of the processing according to the first exemplary embodiment.

FIG. 7 is a flowchart showing an example of the processing according to the first exemplary embodiment.

For example, this processing is started when a user enters the room concerned (a room where seats are not stationary, a so-called free-address room) (for example, when the user holds his/her security card over the card reader at the entrance of the room, when the user punches his/her time card, or when the user's entrance into the room is detected by a position detector). The position detector detects the user's IC card or the like, and the position where the position detector is placed, the date of the detection, and the user information contained in the IC card are stored in a state of being associated with one another. By doing this, the user's action history is obtained.

At step S702, the vacancy information obtaining module 110 obtains the seat information representative of a vacant seat.

At step S704, the area information obtaining module 120 obtains the area information representative of an area where a lighting apparatus or an air conditioning apparatus is used.

At step S706, the intra-area candidate seat information obtaining module 130 obtains, as a recommended candidate seat, the seat obtained at step S702 in the area obtained at step S704.

At step S708, the intra-area candidate seat information obtaining module 130 determines whether a vacant seat is present in the area or not. When a vacant seat is present (when a recommended candidate seat is obtained at step S706), the process proceeds to step S714, and when no vacant seat is present, the process proceeds to step S710.

At step S710, the adjacent candidate seat information obtaining module 140 obtains a recommended candidate seat within an area adjacent to the area obtained at step S704.

At step S712, the environmental load calculation module 150 calculates the environment load in the case where the recommended candidate seat obtained at step S710 is selected.

At step S714, the guide generation module 160 and the output/notification module 170 generate a candidate seat guide, and provide notification or output the guide.

Figure 8:
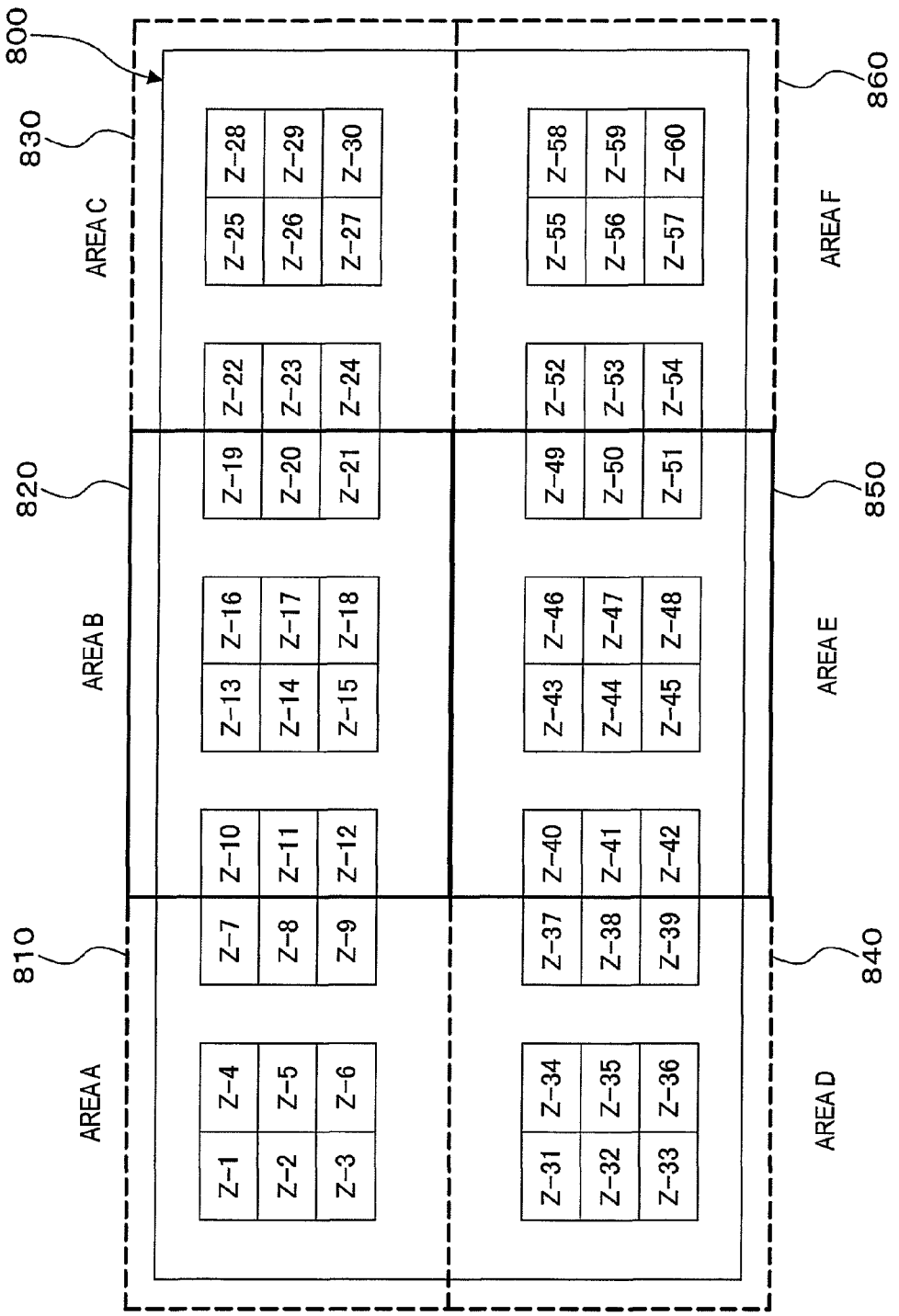
FIG. 8 is an explanatory view showing an example of the processing according to the first exemplary embodiment.

FIG. 8 is an explanatory view showing an example of the processing according to the first exemplary embodiment.

A room 800 is divided into an area A 810, an area B 820, an area C 830, an area D 840, an area E 850, and an area F 860. When the area B 820 is used (when seats in the area B 820 are used and a lighting apparatus or an air conditioning apparatus is used), if any of the seats with IDs of Z-10 to Z-21 is vacant, a guide that recommends this to the user is provided. If none of them is vacant, seats in the area A 810, the area C 830 or the area E 850 adjacent to the area B 820 are made candidates. In this example, the seats with IDs of Z-7, Z-8, and Z-9 in the area A 810 or the seats with IDs of Z-22, Z-23, and Z-24 in the area C 830 are made candidates. When a seat in the area A 810 is selected, the users arriving thereafter are provided with a guide that recommends vacant seats in the area A 810.

Figure 9:
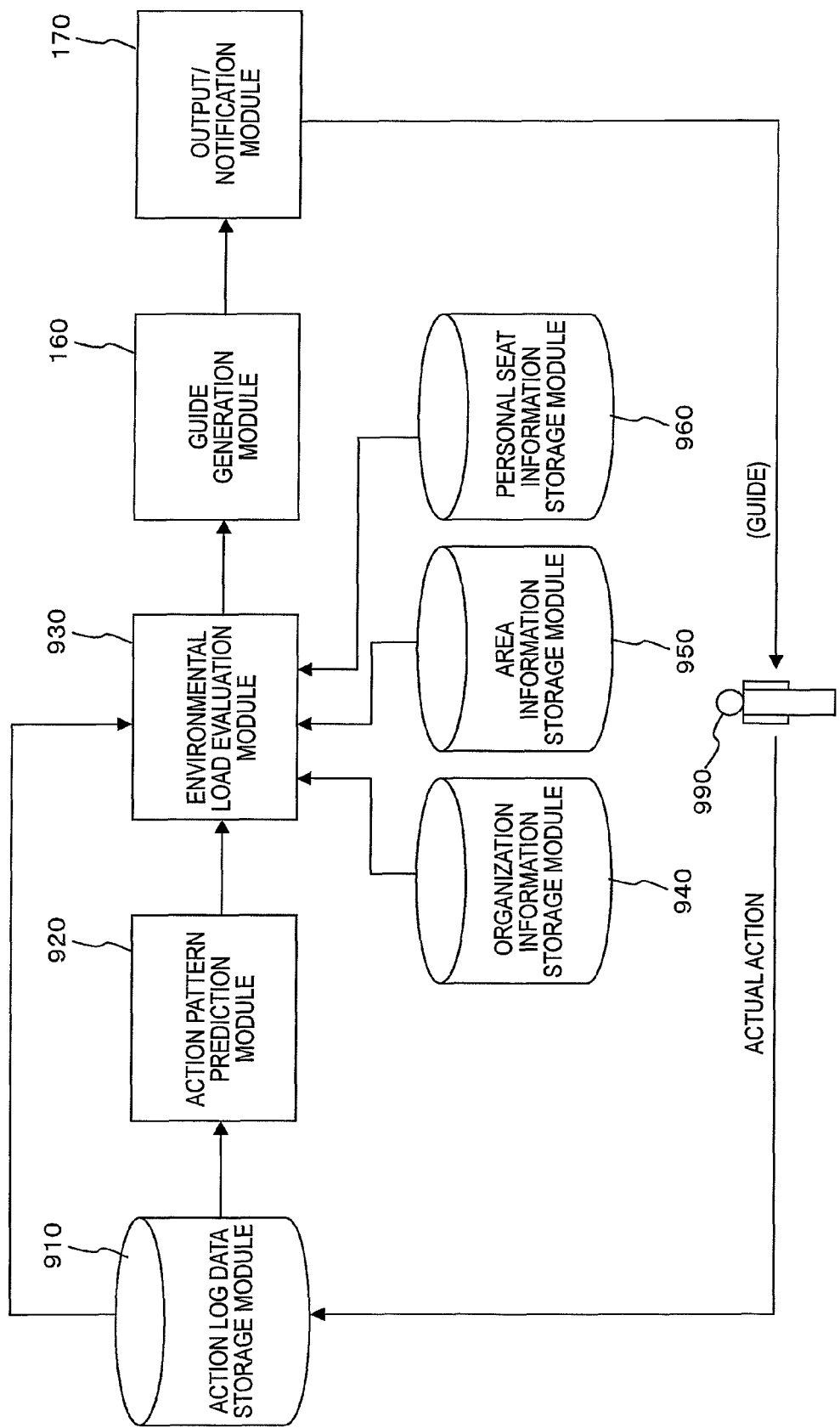
FIG. 9 is a conceptual module block diagram with respect to a structure example of a second exemplary embodiment.

FIG. 9 is a conceptual module block diagram with respect to a structure example of a second exemplary embodiment.

An information processing apparatus according to the second exemplary embodiment is provided with an action log data storage module 910, an action pattern prediction module 920, an environmental load evaluation module 930, an organization information storage module 940, an area information storage module 950, a personal seat information storage module 960, the guide generation module 160, and the output/notification module 170. Hereinafter, parts of the same kinds as those of the above-described exemplary embodiment are denoted by the same reference numerals, and overlapping detailed descriptions are omitted.

The action log data storage module 910 is connected to the action pattern prediction module 920 and the environmental load evaluation module 930. The action log data storage module 910 is a module storing the actual action history of a GPS (global positioning system), a position detector or the like, an electronic mail log, and the communication history of internal telephones or the like. These may be directly transferred or read from a repository of the server. An example of data stored in the action log data storage module 910 is an action log table 1200. FIG. 12 is an explanatory view showing an example of the data structure of the action log table 1200. The action log table 1200 has a member ID column 1210, a date column 1220 and an area ID column 1230. The member ID column 1210 stores a member ID representative of a member. The date column 1220 stores a date. The area ID column 1230 stores the area ID of the place where the member stays at the date. For example, this is an example of the action log data when a position detector such as an active RFID detector is used. This data represents in which area a member stays at a certain time. The action log is not limited thereto but may be coordinate information of the GPS or the like, or information in cases such as when whether a member is seated or not is apparent from the sending history of the electronic mail log from a desktop PC.

Moreover, the action log data storage module 910 may store, for example, a seat occupation statistic table 1300. FIG. 13 is an explanatory view showing an example of the data structure of the seat occupation statistic table 1300. The seat occupation statistic table 1300 has a time period column 1310, a Sunday column 1320, a Monday column 1330, a Tuesday column 1340, a Wednesday column 1350, a Thursday column 1360, a Friday column 1370 and a Saturday column 1380. The seat occupation statistic table 1300 is generated from the action log table 1200, and shows the number of seated members in each time period on each day in the room concerned. This is an example of the result of calculation of the statistics for seat occupation prediction by the action pattern prediction module 920. In this example, it is calculated as the number of times a member stays at an area ID that becomes his/her seat as seat occupation. In the case of a free-address room, it occurs that the seat differs according to the date or the time period.

The action pattern prediction module 920 is connected to the action log data storage module 910 and the environmental load evaluation module 930. The action pattern prediction module 920 is a module obtaining a trend by calculating the statistics of each person and group from the past history.

The environmental load evaluation module 930 is connected to the action log data storage module 910, the action pattern prediction module 920, the organization information storage module 940, the area information storage module 950, the personal seat information storage module 960 and the guide generation module 160. The environmental load evaluation module 930 is a module making an evaluation as to the environmental load and determining the recommended measures with respect to the use of areas. The processing in the environmental load evaluation module 930 will be described later by a (2-1)th to (2-3)th exemplary embodiments.

The organization information storage module 940 is connected to the environmental load evaluation module 930. The organization information storage module 940 is a module storing information related to an organization and the members belonging to the organization. An example of the information related to an organization and the members making up the organization is organization user information storing, in a state of being associated with each other, organization information representative of an organization and user information representative of the users belonging to the organization as information related to the members making up the organization.

Figures 10, 11:
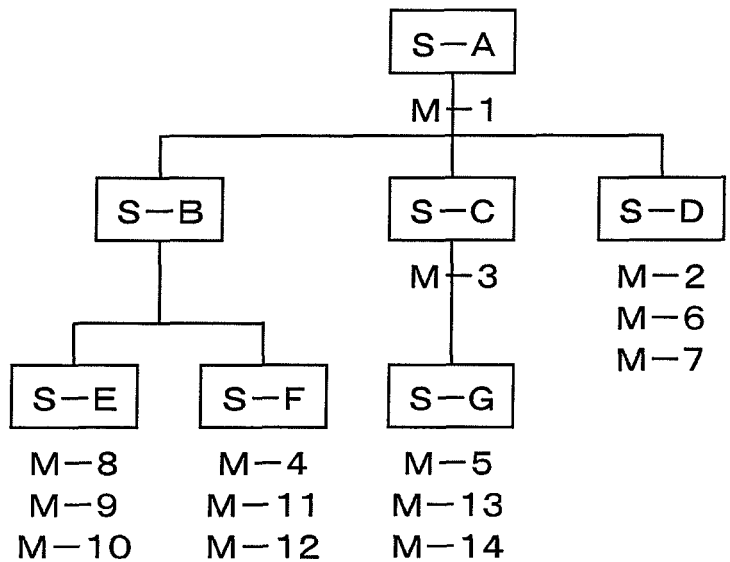
FIG. 10 is an explanatory view showing an example of the hierarchical structure of organizations.
FIG. 11 is an explanatory view showing an example of the data structure of an organization-member table.

FIG. 10 is an explanatory view showing an example of the hierarchical structure of organizations. The organizations have a tree structure as illustrated in FIG. 10. For example, immediately below an organization S-A, a member M-1 is present, and organizations S-B, S-C, and S-D are present. Immediately below the organization S-B, organizations S-E and S-F are present, the organization S-E includes members M-8, M-9, and M10 and the organization S-F includes members M-4, M-11, and M-12.

The organization information storage module 940 may store the information illustrated in FIG. 10, for example, like an organization-member table 1100. FIG. 11 is an explanatory view showing an example of the data structure of the organization-member table 1100. The organization-member table 1100 has an organization ID column 1110 and a member ID column 1120. The organization ID column 1110 stores the organization information representative of an organization. The member ID column 1120 stores member IDs representative of the members belonging to the organization. Members (constituents of an organization) include an organization. More than one member may belong to one organization.

The area information storage module 950 is connected to the environmental load evaluation module 930. The area information storage module 950 is a module storing attributes such as area sizes. For example, it stores the area-seat table 600 illustrated in FIG. 6.

The personal seat information storage module 960 is connected to the environmental load evaluation module 930. The personal seat information storage module 960 is a module storing area information representative of an area of a personal seat that varies according to the date in a case where the room is a free-address room. The information may be stored in the action log data storage module 910 as a part of the action log. Since the actual action is reflected in the action log also when the guide is not followed, the actual action is reflected also in the recommended placement in the guide for the user arriving next, and recommended placement at each point of time is made.

The guide generation module 160 is connected to the environmental load evaluation module 930 and the output/notification module 170. The guide generation module 160 is a module generating a message related to the recommended measures.

The output/notification module 170 is connected to the guide generation module 160. The output/notification module 170 is a module displaying or conveying the message generated by the guide generation module 160.

FIGS. 14A to 14E are explanatory views showing an example of the relationship between the arrival rate and seats of each organization.

A room 1400 is divided into an organization concentration area 1410, an organization concentration area 1420, an organization concentration area 1430 and an organization concentration area 1440. Like the description of the first exemplary embodiment, these areas are each an "area where a lighting apparatus or an air conditioning apparatus is adjustable". Moreover, a guide is provided by the second exemplary embodiment so that members of one organization are seated in a cluster. That is, energy efficiency is higher when lighting and air conditioning are concentrated, and business efficiency is higher when related persons are seated near to one another. Therefore, how many members come is predicted for each day and for each time period to guide the members to seats. For example, the graph shown in FIG. 14A shows the relationship between the time period and the arrival rate (the ratio of the members seated in the room) with respect to the members of the organization S-D. Therefore, the number of users in the room in each time period is predicted from the number of members of the organization and the arrival rate to determine the number of areas. Since the relationship between the time period and the arrival rate differs among organizations like this, the seat to be taken is determined by using that.

Figure 15:
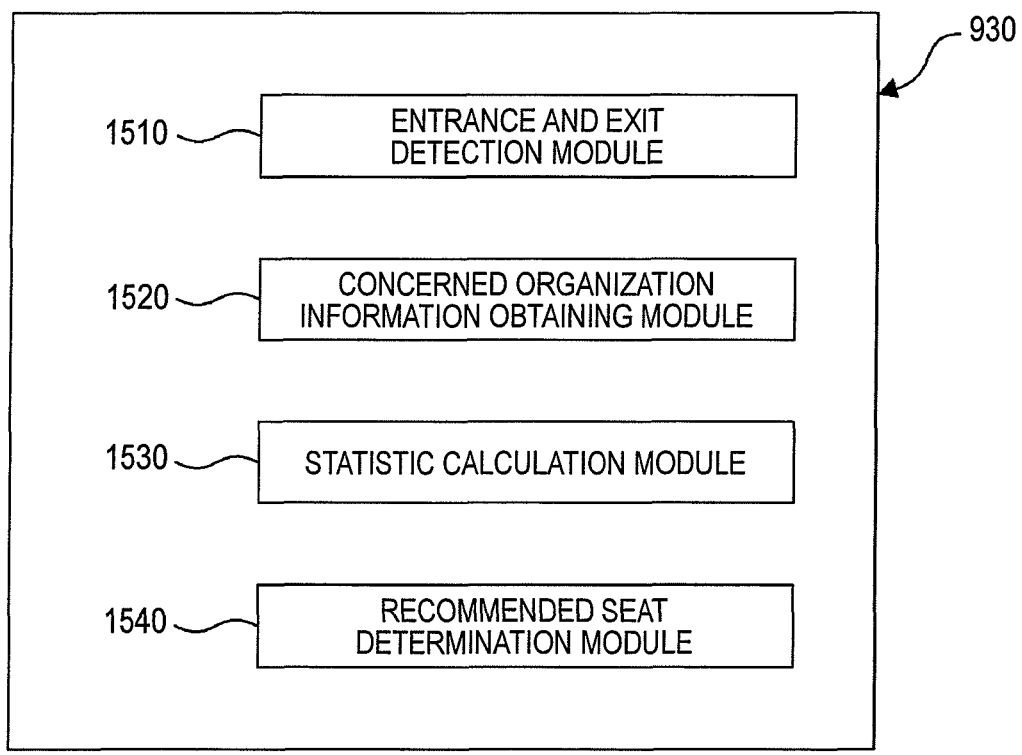
FIG. 15 is a conceptual module block diagram with respect to an example of the structure in an environmental load evaluation module of a (2-1)th exemplary embodiment.

The (2-1)th exemplary embodiment uses the module structure of the information processing apparatus as the second exemplary embodiment illustrated in FIG. 9. FIG. 15 is a conceptual module block diagram with respect to an example of the structure in the environmental load evaluation module 930 of the (2-1)th exemplary embodiment.

The environmental load evaluation module 930 is provided with an entrance and exit detection module 1510, a concerned organization information obtaining module 1520, a statistic calculation module 1530, and a recommended seat determination module 1540.

The entrance and exit detection module 1510 detects a user's entrance and exit to and from the room. This corresponds to cases such as when the user holds his/her security card over the card reader at the entrance of the room, when the user pouches his/her time card and when the user's entrance into the room is detected by a position detector as described in the first exemplary embodiment.

In a case where an entrance is detected by the entrance and exit detection module 1510, when the entering user is the first user that enters (that is, when the user is the first person that enters the room), the concerned organization information obtaining module 1520 obtains the user information representative of the users belonging to the organization using the room, by using the organization-member table 1100. The organization-member table 1100 is generated for each room used, and is associated with the room. Therefore, it is possible to obtain the number of organizations using the room by counting the number of organizations in the organization-member table 1100.

Moreover, in a case where an entrance is detected by the entrance and exit detection module 1510, when the entering user is not the first user that enters (that is, when the first person that enters is already in the room and the entering user is the second or subsequent person that enters the room), the concerned organization information obtaining module 1520 obtains the organization information of the organization to which the user whose entrance is detected by the entrance and exit detection module 1510 belongs, by using the organization-member table 1100.

The statistic calculation module 1530 calculates the number of users of the organization using the room based on information on the past actions of the users represented by the user information obtained by the concerned organization information obtaining module 1520. For example, the statistic calculation module 1530 calculates the number of users of the organization using the room by using the action log table 1200 and the seat occupation statistic table 1300. In this case, the number of users of the organization using the room may be calculated for each day or for each time period (including a combination of a days and a time period).

The recommended seat determination module 1540 may associate the organization information representative of the organization and the seat information representative of the seats in the room used by the organization based on the number of users calculated by the statistic calculation module 1530 and determine the seat for the user whose entrance is detected by the entrance and exit detection module 1510 from among the associated seats. It is to be noted that a seat is selected that is represented by the seat information associated with the organization information representative of the organization to which the user belongs.

Moreover, the recommended seat determination module 1540 associates the organization information representative of the organization and the area information representative of the areas in the room used by the organization based on the number of users calculated by the statistic calculation module 1530 and determines the seat for the user whose entrance is detected by the entrance and exit detection module 1510 in the area. The area referred to here is the "area where a lighting apparatus or an air conditioning apparatus is adjustable" according to the first exemplary embodiment as described above. The association between the organization information and the area information may be one-to-one association, plural-to-one association, one-to-plural association or plural-to-plural association.

Moreover, the recommended seat determination module 1540 may determine the seat for the user whose entrance is detected by the organization-member table 1100 from among the seats represented by the seat information associated with the organization information obtained by the concerned organization information obtaining module 1520.

Moreover, the recommended seat determination module 1540 may determine the seat for the user whose entrance is detected by the organization-member table 1100 in the area represented by the area information associated with the organization information obtained by the concerned organization information obtaining module 1520.

In the association between the organization information and the seat information performed by the recommended seat determination module 1540, the association between the organization information and the seat information is changed so that the seats of the members included in the same organization are not far apart. Moreover, a plurality of seats may be determined as recommended candidate seats. Further, the processing by the environmental load calculation module 150 of the first exemplary embodiment may be performed.

Then, by the guide generation module 160 and the output/notification module 170, the seat determined by the recommended seat determination module 1540 is presented to the user whose entrance is detected by the entrance and exit detection module 1510.

Figure 16:
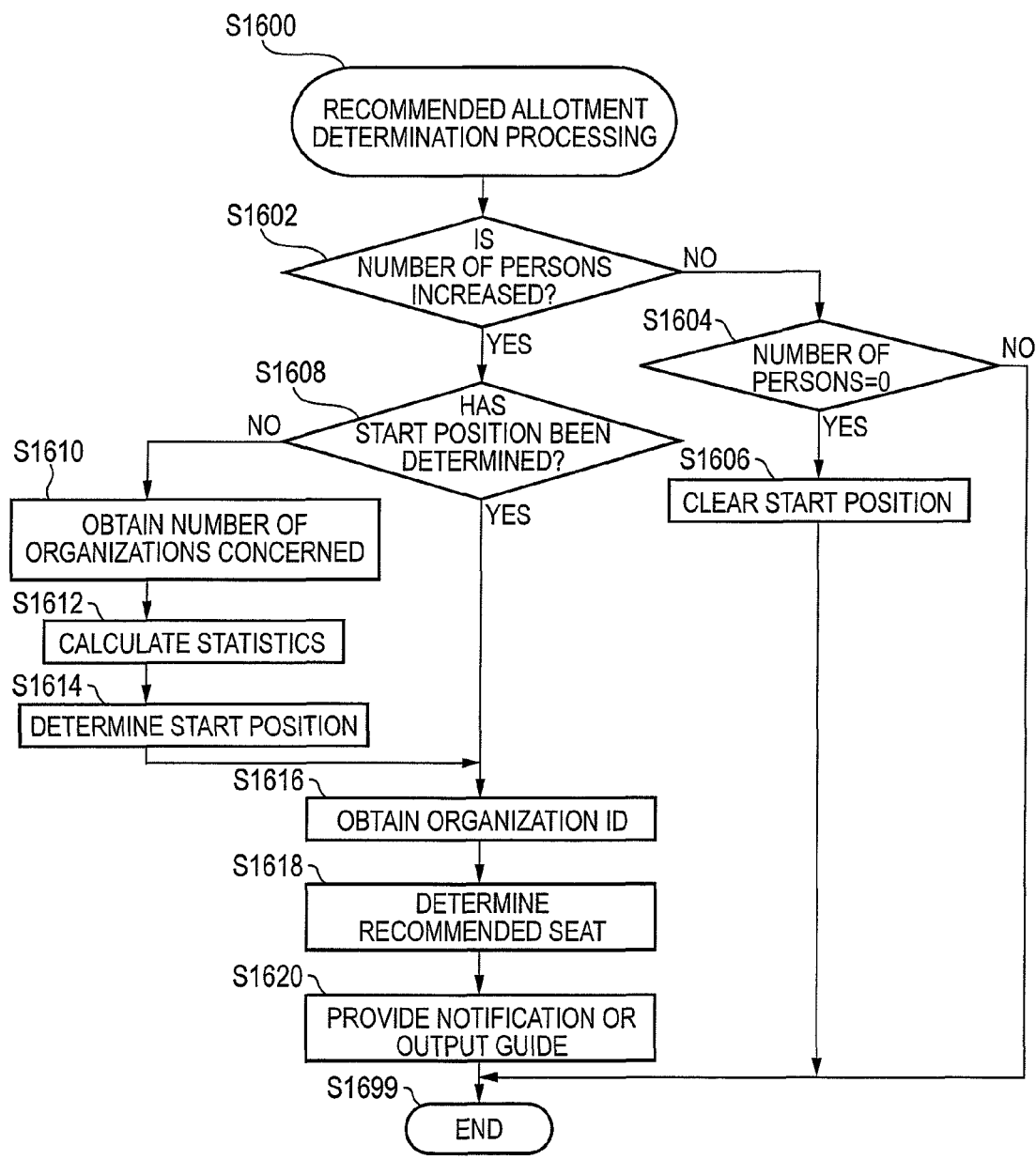
FIG. 16 is a flowchart showing an example of the processing according to the (2-1)th exemplary embodiment.

FIG. 16 is a flowchart showing an example of the processing according to the (2-1)th exemplary embodiment. This is an example of the processing performed when a plurality of organizations share a free-address room. This processing is started when a user's entrance or exit is detected by the entrance and exit detection module 1510 (when the number of seated persons is changed).

At step S1602, the concerned organization information obtaining module 1520 determines whether the number of persons is increased or not. When the number is increased (when a user enters), the process proceeds to step S1608, and when the number is not increased (when a user exits), the process proceeds to step S1604.

At step S1604, the concerned organization information obtaining module 1520 determines whether the number of persons is zero or not. When the number is zero (when all exit), the process proceeds to step S160, and when the number is not zero, the processing is ended (step S1699).

At step S1606, the concerned organization information obtaining module 1520 clears the start position. The start position will be described at step S1614.

At step S1608, the concerned organization information obtaining module 1520 determines whether the start position has been determined or not. When it has been determined (when the user is not the first person that enters the room), the process proceeds to step S1616, and it has not been determined yet (when the user is the first person that enters the room), the process proceeds to step S1610.

At step S1610, the concerned organization information obtaining module 1520 obtains the number of concerned organizations using the room. As mentioned above, the organization-member table 1100 associated with the room is used.

Figure 19:
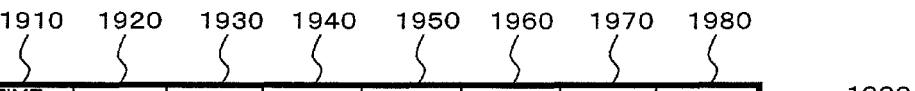
FIG. 19 is an explanatory view showing an example of the data structure of a seat occupation statistic table.

At step S1612, the statistic calculation module 1530 calculates the statistics. The following are obtained: the seat occupation prediction statistics of the users using the room; and the seat occupation prediction statistics of the organizations which are collections of the seat occupation prediction statistics of the users. The seat occupation prediction statistics of the organization S-E will be described by using FIGS. 17 to 20. As shown in the organization-member table 1100 illustrated in FIG. 11, M-8, M-9, and M-10 belong to the organization S-E as members. A seat occupation statistic table 1700 illustrated in FIG. 17 shows the seat occupation statistics, of the room, of the member M-8 of the organization S-E for 26 weeks (statistics representative of the number of times the member M-8 is seated in the room in each time period on each day). A seat occupation statistic table 1800 illustrated in FIG. 18 shows the seat occupation statistics, of the room, of the member M-9 of the organization S-E for 26 weeks (statistics representative of the number of times the member M-9 is seated in the room in each time period on each day). A seat occupation statistic table 1900 illustrated in FIG. 19 shows the seat occupation statistics, of the room, of the member M-10 of the organization S-E for 26 weeks (statistics representative of the number of times the member M-10 is seated in the room in each time period on each day).

Figure 20:
FIG. 20 is an explanatory view showing an example of the data structure of an organization seat occupation statistic table.

An organization seat occupation statistic table 2000 illustrated in FIG. 20 shows the average seat occupation value in each time period on each day calculated by adding the seat occupation values in each time period on each day of the seat occupation statistic table 1700, the seat occupation statistic table 1800 and the seat occupation statistic table 1900 and dividing the sum by 26 (weeks). For example, in the time period 11:00 on Monday, since the average is 2.5, the use of three persons is predicted. That is, this indicates that it is necessary to prepare seats for three persons for the organization S-E in that time period.

At step S1614, the concerned organization information obtaining module 1520 determines the start position. The ratio of the seats used by each organization from that time on that day is determined from the statistics calculated at step S1612. According to the ratio, the area ratio (the ratio of the number of seats) is obtained, and the seat use start position is determined. That is, association between the organizations and the seats is performed. Moreover, in this case, association between the organizations and the seats may be performed so that the members of the same organization are within the same area. That is, the organization information representative of the organizations and the area information representative of the areas are associated with each other. Then, as the use start position, when the person entering next is a member of another organization, the first seat is determined as the use start position (more than one seat may be included) so as to be an adjacent position. To obtain this adjacent seat, the seat position table 200 and the area position table 400 may be used.

In the association between the organizations and the seats performed here, the organization information representative of an organization and the seat information representative of the seats in the room used by the organization may be associated with each other by comparing information on the past actions of the users belonging to the organization to which the entering user belongs with information on the past actions of the users belonging to an organization other than the organization to which the entering user belongs, by using the organization-member table 1100. This is to perform dynamic seat layout for an exceptional event (an organization the work styles of the users belonging to which are not consistent). More specifically, when the difference between the average value of the information on the past actions of the users belonging to an organization A and the average value of the information on the past actions of the users belonging to an organization B is not less than a predetermined value, it is determined that the action trends of the organizations are different, and association is performed so that the seats of the organization A and those of the organization B are apart from each other. When the difference between the average value of the information on the past actions of the users belonging to the organization A and the average value of the information on the past actions of the users belonging to the organization B is less than the predetermined value, it is determined that the action trends of the organizations are the same, and association is performed so that the seats of the organization A and those of the organization B are near each other. The average value of the information on the past actions of the users belonging to an organization corresponds, for example, to the average seat occupation value in each time period on each day in the above-described organization seat occupation statistic table 2000 illustrated in FIG. 20. Then, the difference in average seat occupation value in each time period on each day among the organizations is calculated. Then, the total value, the average value, the median value or the like of the differences is compared with a predetermined value.

At step S1616, the recommended seat determination module 1540 obtains the organization ID of the organization to which the entering person belongs. This is performed by using the organization-member table 1100.

At step S1618, the recommended seat determination module 1540 determines the seat to be recommended to the entering person. That is, the area of the seats to be taken by the members of the organization is obtained from the organization and the area associated at step S1614, and the seat to be recommended is determined from among the vacant seats in the area.

Here, the recommended seat determination module 1540 may determine the entering user's seat by comparing the information on the entering user's past actions and the information on the past actions of the users belonging to the organization represented by the organization ID obtained at step S1616 (that is, the information on the past actions of the users belonging to the same organization as the entering user). This is to perform dynamic seat layout for an exceptional event (a user whose action trend is different from that of the organization). More specifically, when the difference between the average value of the information on the past actions of the users belonging to the organization and the information on the past action of the user concerned is not less than a predetermined value, it is determined that the user is a user whose action trend is different from that of the organization, and a seat situated in a position at an end (a position apart from the center, or a position on the border with another organization) among the seats associated with the organization is selected for the user. When the difference between the average value of the information on the past actions of the users belonging to the organization and the information on the past action of the user concerned is less than the predetermined value, it is determined that the user is a user whose action trend is the same as that of the organization, and a seat situated the closest to the central position at that time among the vacant seats is selected for the user. The average value of the information on the past actions of the users belonging to an organization corresponds, for example, to the average seat occupation value in each time period on each day in the above-described organization seat occupation statistic table 2000 illustrated in FIG. 20. Then, the difference in average seat occupation value in each time period on each day between the organization and the user is calculated. Then, the total value, the average value, the median value or the like of the differences is compared with a predetermined value.

At step S1620, the guide generation module 160 and the output/notification module 170 generate a guide, and provide notification or output the guide.

Figure 21:
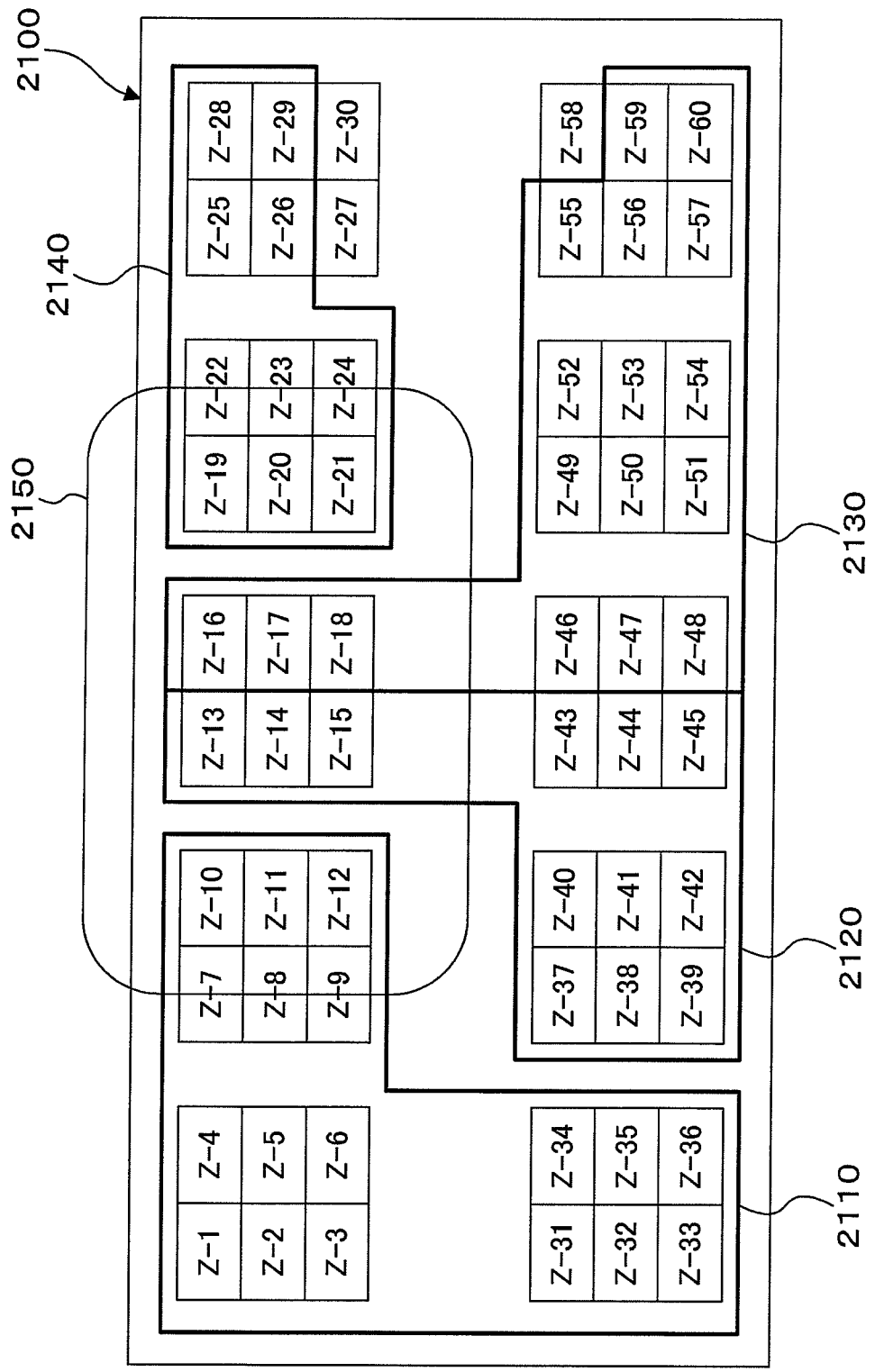
FIG. 21 is an explanatory view showing an example of the processing according to the (2-1)th exemplary embodiment.

FIG. 21 is an explanatory view showing an example of the processing according to the (2-1)th exemplary embodiment.

A room 2100 is divided into an organization S-W 2110, an organization S-X 2120, an organization S-Y 2130, and an organization S-Z 2140 by the processing of the (2-1)th exemplary embodiment. Then, a use start area 2150 is set as the use start position. The use start area 2150 may be set so as to coincide with an area (the "area where a lighting apparatus or an air conditioning apparatus is adjustable" according to the above-described first exemplary embodiment). That is, the seats in the use start area 2150 are occupied by members of each organization who enter the room early. This is performed by the processing in which the user information representative of users who perform an action of entering the room before a predetermined time in the past is obtained and the seats for these users are set within a predetermined area. Even in that case, the seats for the entering users are determined so that the seats of the users belonging to the same organization are adjacent to one another.

Figure 22:
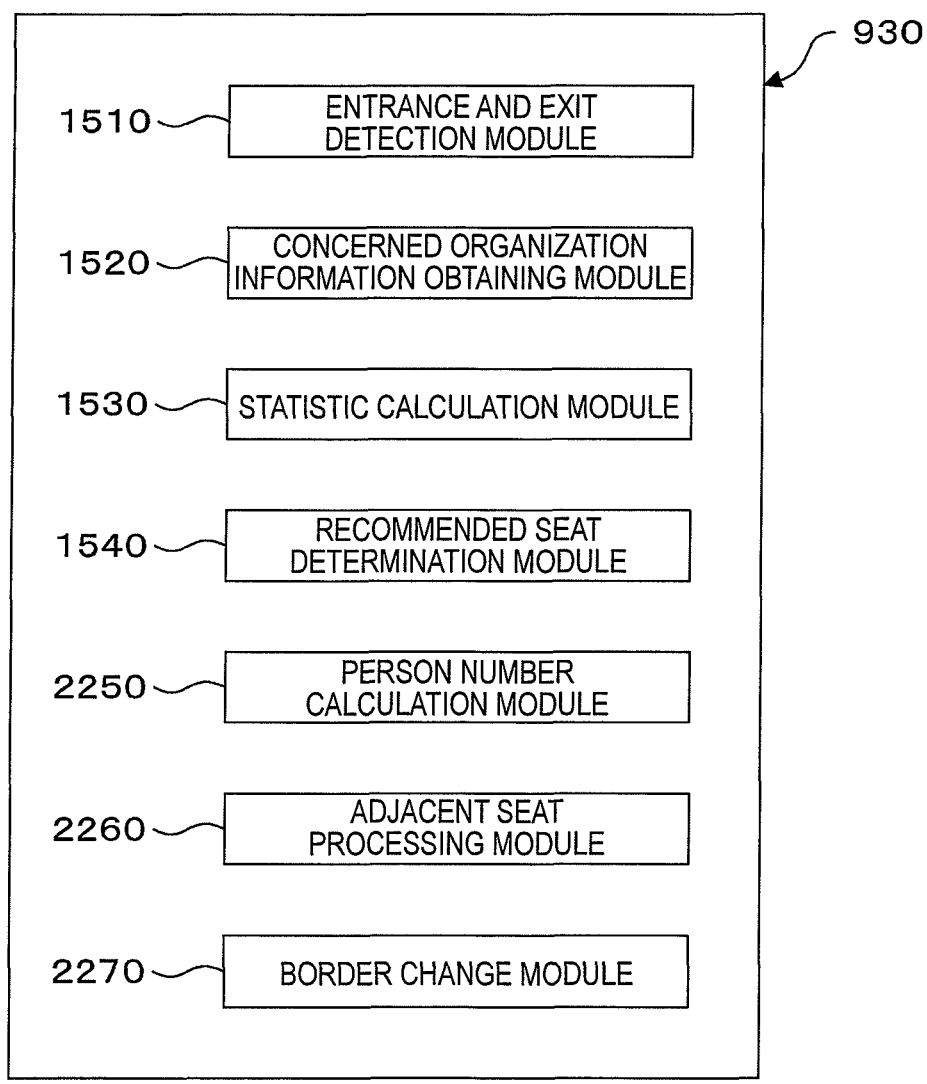
FIG. 22 is a conceptual module block diagram with respect to an example of the structure in an environmental load evaluation module of a (2-2)th exemplary embodiment.

The (2-2)th exemplary embodiment uses the module structure of the information processing apparatus as the second exemplary embodiment illustrated in FIG. 9. FIG. 22 is a conceptual module block diagram with respect to an example of the structure in the environmental load evaluation module 930 of the (2-2)th exemplary embodiment.

The environmental load evaluation module 930 is provided with the entrance and exit detection module 1510, the concerned organization information obtaining module 1520, the statistic calculation module 1530, the recommended seat determination module 1540, a person number calculation module 2250, an adjacent seat processing module 2260, and a border change module 2270. In the (2-2)th exemplary embodiment, when there is an organization the number of members of which is larger than the number predicted from past actions, the border position is changed according to the seat occupation condition.

The person number calculation module 2250 calculates the number of entering users belonging to each organization when an entrance is detected by the entrance and exit detection module 1510.

The adjacent seat processing module 2260 obtains a vacant seat from among seats adjacent to the seats represented by the seat information associated with the organization information obtained by the concerned organization information obtaining module 1520 when the number of entering users belonging to the organization exceeds the number of users of the organization calculated by the statistic calculation module 1530.

The border change module 2270 determines whether or not a vacant seat is present among seats adjacent to the seats represented by the seat information associated with the organization information obtained by the concerned organization information obtaining module 1520 (whether a seat is obtained by the adjacent seat processing module 2260 or not) when the number of entering users belonging to the organization exceeds the number of users of the organization calculated by the statistic calculation module 1530. When a vacant seat is present, the seat information associated with the organization information is changed.

Figure 23:
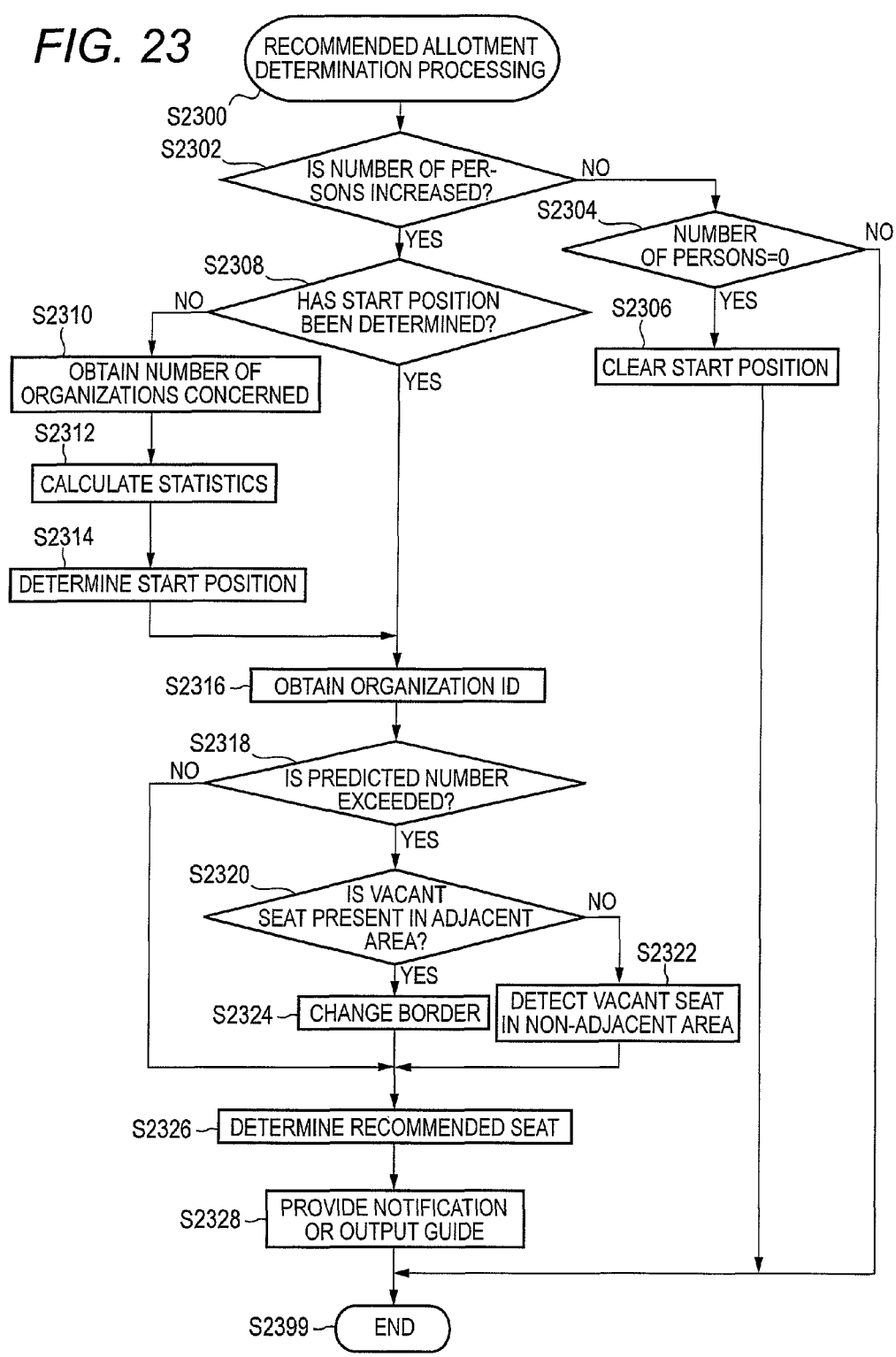
FIG. 23 is a flowchart showing an example of the processing according to the (2-2)th exemplary embodiment.

FIG. 23 is a flowchart showing an example of the processing according to the (2-2)th exemplary embodiment.

The processing from steps S2302 to S2316 is similar to the processing from steps S1602 to S1616 of the flowchart illustrated in FIG. 16.

At step S2318, the person number calculation module 2250 determines whether or not the number of entering users exceeds, by an entrance, the predicted number of users of the organization to which the entering person belongs which predicted number is obtained from the statistics calculated at step S2312. When the number exceeds, the process proceeds to step S2320, and when the number does not exceed, the process proceeds to step S2326.

At step S2320, the adjacent seat processing module 2260 determines whether a vacant seat is present in an adjacent area or not. When a vacant seat is present, the process proceeds to step S2324, and when no vacant seat is present, the process proceeds to step S2322.

At step S2322, the adjacent seat processing module 2260 detects a vacant seat in a non-adjacent area. That is, it detects a vacant seat situated in a non-adjacent place.

At step S2324, the border change module 2270 changes the border of the seats associated with the organization.

At step S2326, the recommended seat determination module 1540 determines the recommended seat.

At step S2328, the guide generation module 160 and the output/notification module 170 generate a guide, and provide notification or output the guide.

Figure 24:
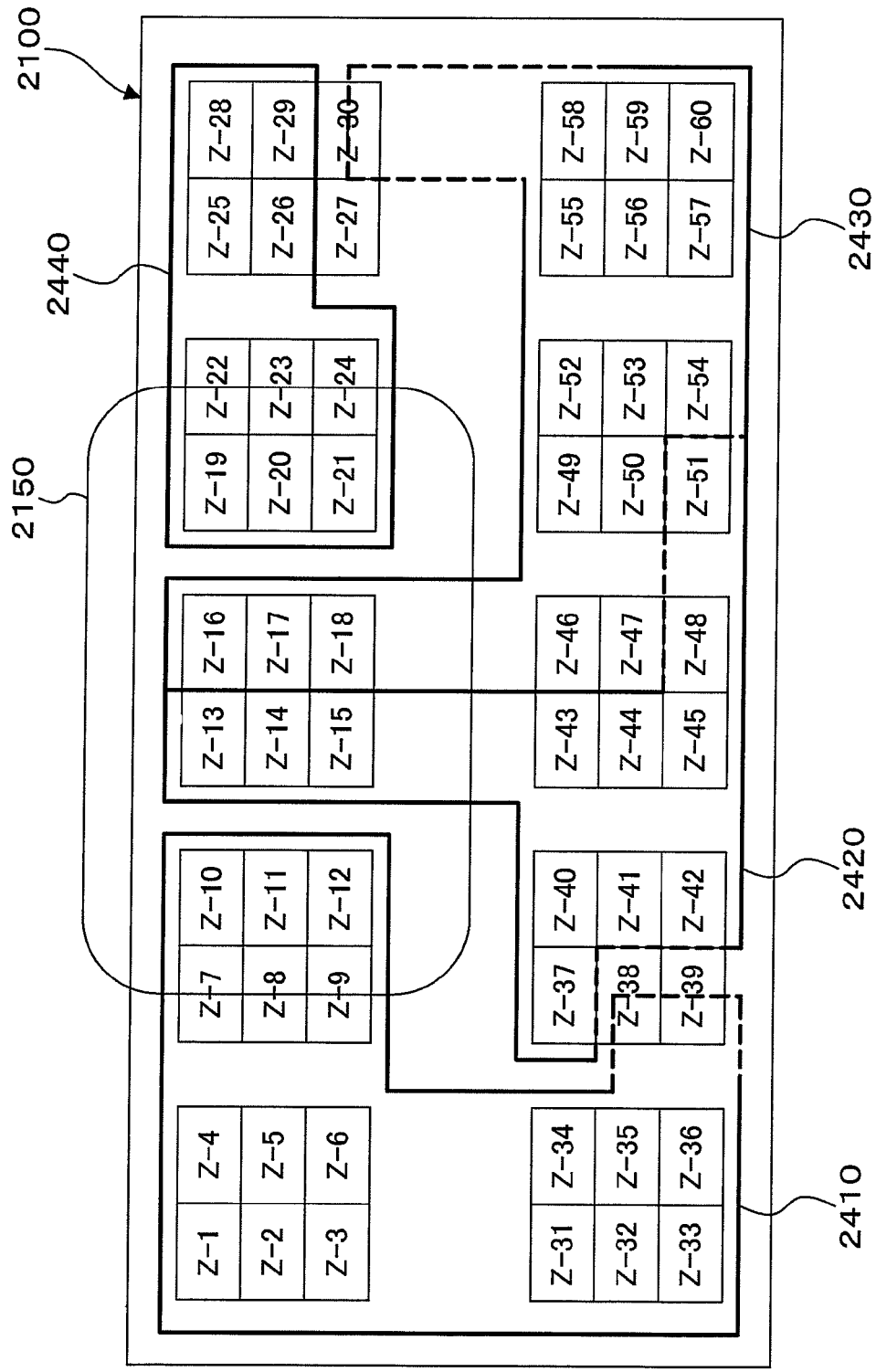
FIG. 24 is an explanatory view showing an example of the processing according to the (2-2)th exemplary embodiment.

FIG. 24 is an explanatory view showing an example of the processing according to the (2-2)th exemplary embodiment. This shows an example in which more members belonging to an organization W than predicted enter the room after the association between the organization information and the seat information is performed as illustrated in FIG. 21. A room 2100 is divided into an organization S-W 2410, an organization S-X 2420, an organization S-Y 2430, and an organization S-Z 2440 by the processing of the (2-3)th exemplary embodiment.

In this example, since the seats for each organization start to be occupied from the use start area 2150, vacant seats Z-38 and Z-39 of the organization S-X 2120 in FIG. 21 are reallotted to the organization S-W (the organization S-W 2410 shown in the example of FIG. 24). Instead, vacant seats Z-48 and Z-51 of the organization S-Y 2130 in FIG. 21 are reallotted to an organization X (the organization S-X 2420 shown in the example of FIG. 24). Further, seats Z-30 and Z-58 in FIG. 21 are allotted to an organization Y (the organization S-Y 2430 shown in the example of FIG. 24). By doing this, the border position is shifted. In this change, the association between the organization information and the seat information is changed so that the seats of the members belonging to the same organization are not far apart.

Figure 25:
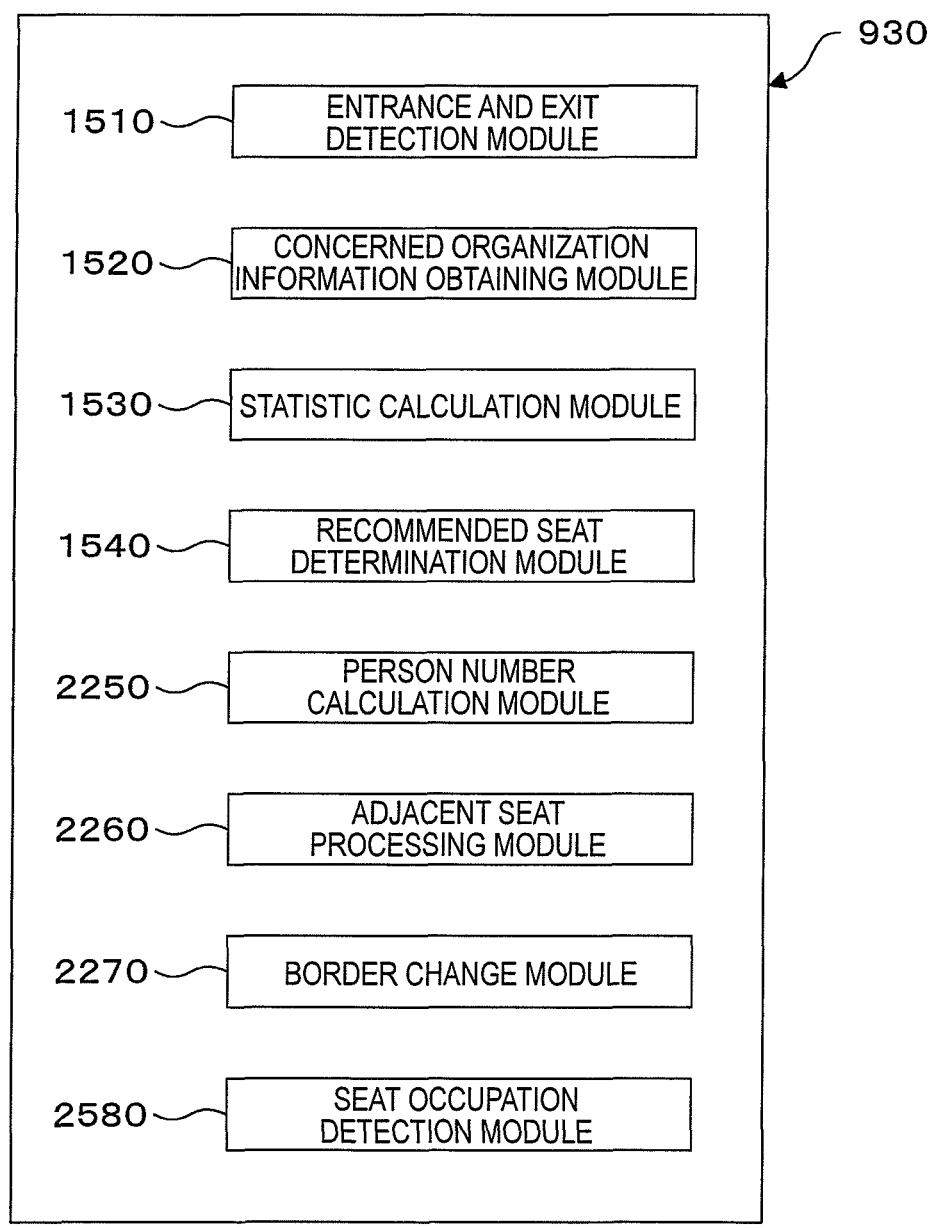
FIG. 25 is a conceptual module block diagram with respect to an example of the structure in an environmental load evaluation module of the (2-3)th exemplary embodiment.

The (2-3)th exemplary embodiment uses the module structure of the information processing apparatus as the second exemplary embodiment illustrated in FIG. 9. FIG. 25 is a conceptual module block diagram with respect to an example of the structure in the environmental load evaluation module 930 of the (2-3)th exemplary embodiment.

The environmental load evaluation module 930 is provided with the entrance and exit detection module 1510, the concerned organization information obtaining module 1520, the statistic calculation module 1530, the recommended seat determination module 1540, the person number calculation module 2250, the adjacent seat processing module 2260, the border change module 2270, and a seat occupation detection module 2580. In the (2-3)th exemplary embodiment, when there is a user who selects a seat different from the seat presented in the (2-3)th exemplary embodiment, a different combination such that the number of persons is the same and the selected seat is included is allotted.

The seat occupation detection module 2580 detects the seat occupied by the user. For example, the user's position is detected by a position detector, and the seat occupied by the user is detected by the seat position table 200.

Then, in addition to the processing by the border change module 2270 of the (2-2)th exemplary embodiment, when the seat detected by the seat occupation detection module 2580 is different from the seat presented by the guide generation module 160 and the output/notification module 170, the border change module 2270 obtains the organization information representative of the organization to which the user of the seat belongs by using the organization-member table 1100, and changes the seat information associated with the organization information. The different seat referred to here indicates, in a case where more than one seat is presented by the guide generation module 160 and the output/notification module 170, that the user actually takes a seat that is not among the presented seats.

Figure 26:
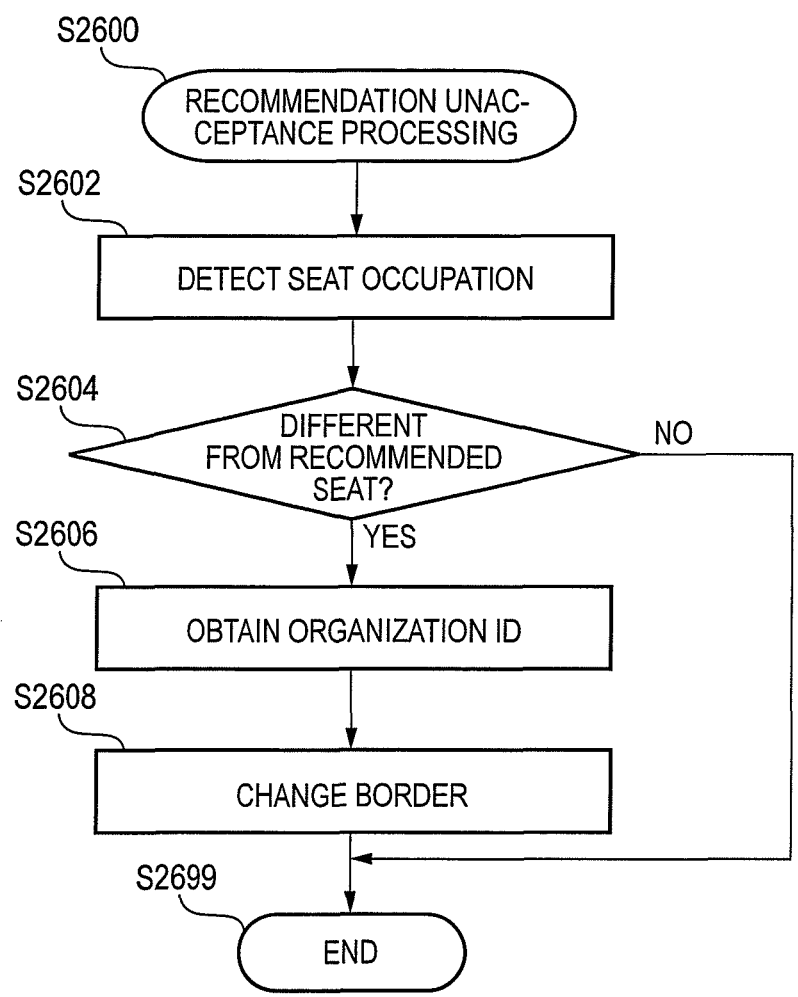
FIG. 26 is a flowchart showing an example of the processing according to the (2-3)th exemplary embodiment.

FIG. 26 is a flowchart showing an example of the processing according to the (2-3)th exemplary embodiment.

At step S2602, the seat occupation detection module 2580 detects seat occupation.

At step S2604, the recommended seat determination module 1540 determines whether the occupied seat is different from the recommended seat (the seat presented by the guide generation module 160 and the output/notification module 170) or not. When it is different, the process proceeds to step S2606, and when it is not different, the process is ended (step S2699).

At step S2606, the recommended seat determination module 1540 obtains the organization ID of the organization to which the user seated in the different seat belong. For this processing, the organization-member table 1100 is used.

At step S2608, the border change module 2270 changes the border (the seat information associated with the organization information).

Figure 27:
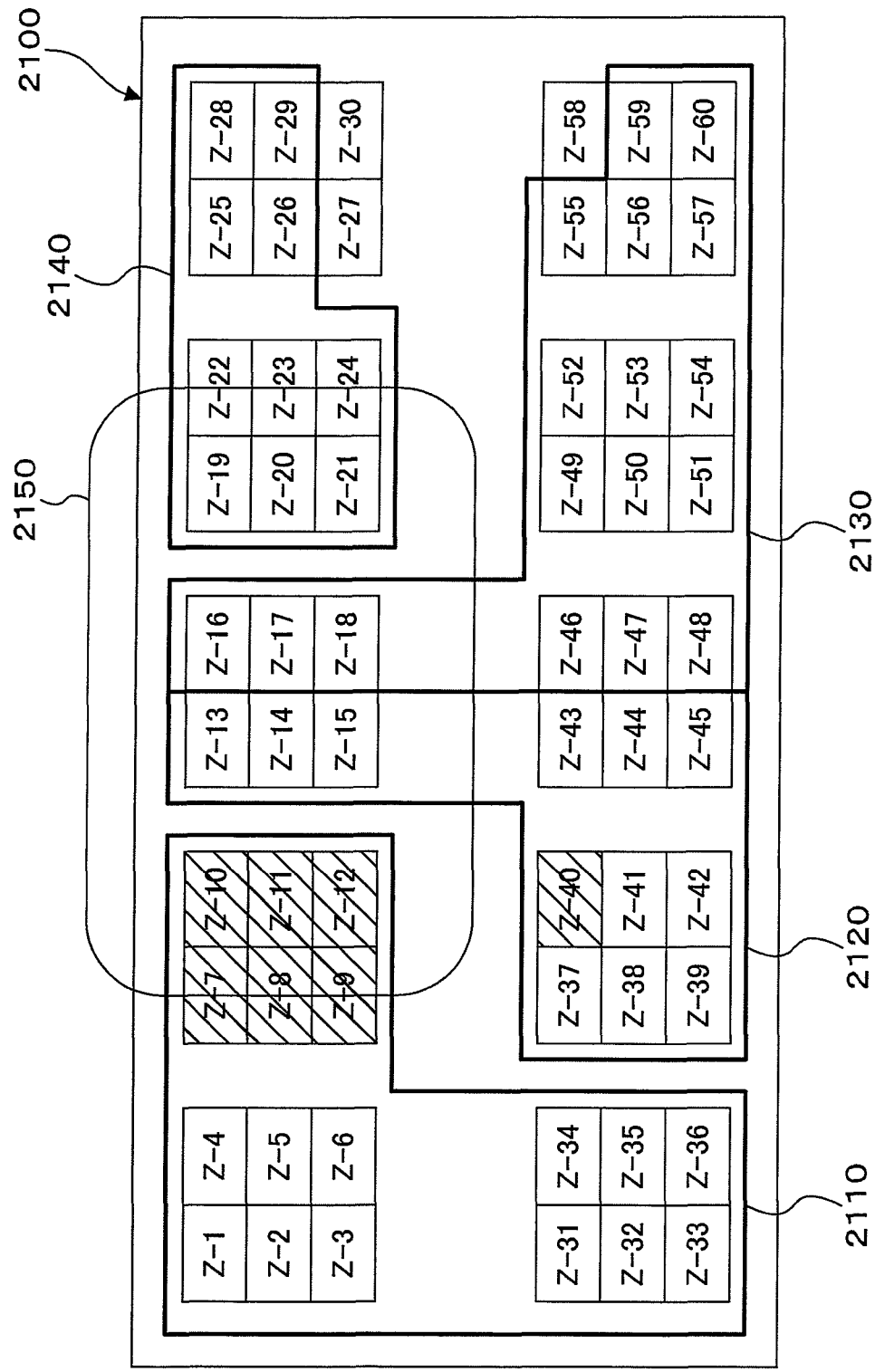
FIG. 27 is an explanatory view showing an example (1) of the processing according to the (2-3)th exemplary embodiment.

FIG. 27 is an explanatory view showing an example (1) of the processing according to the (2-3)th exemplary embodiment. This shows an example in a case where after the association between the organization information and the seat information is performed as illustrated in FIG. 21, although seats Z-7 to Z-12 are taken by the persons to whom they are recommended, the next entering person does not take the recommended seat (for example, a seat Z-4) but takes a seat Z-40.

Figure 28:
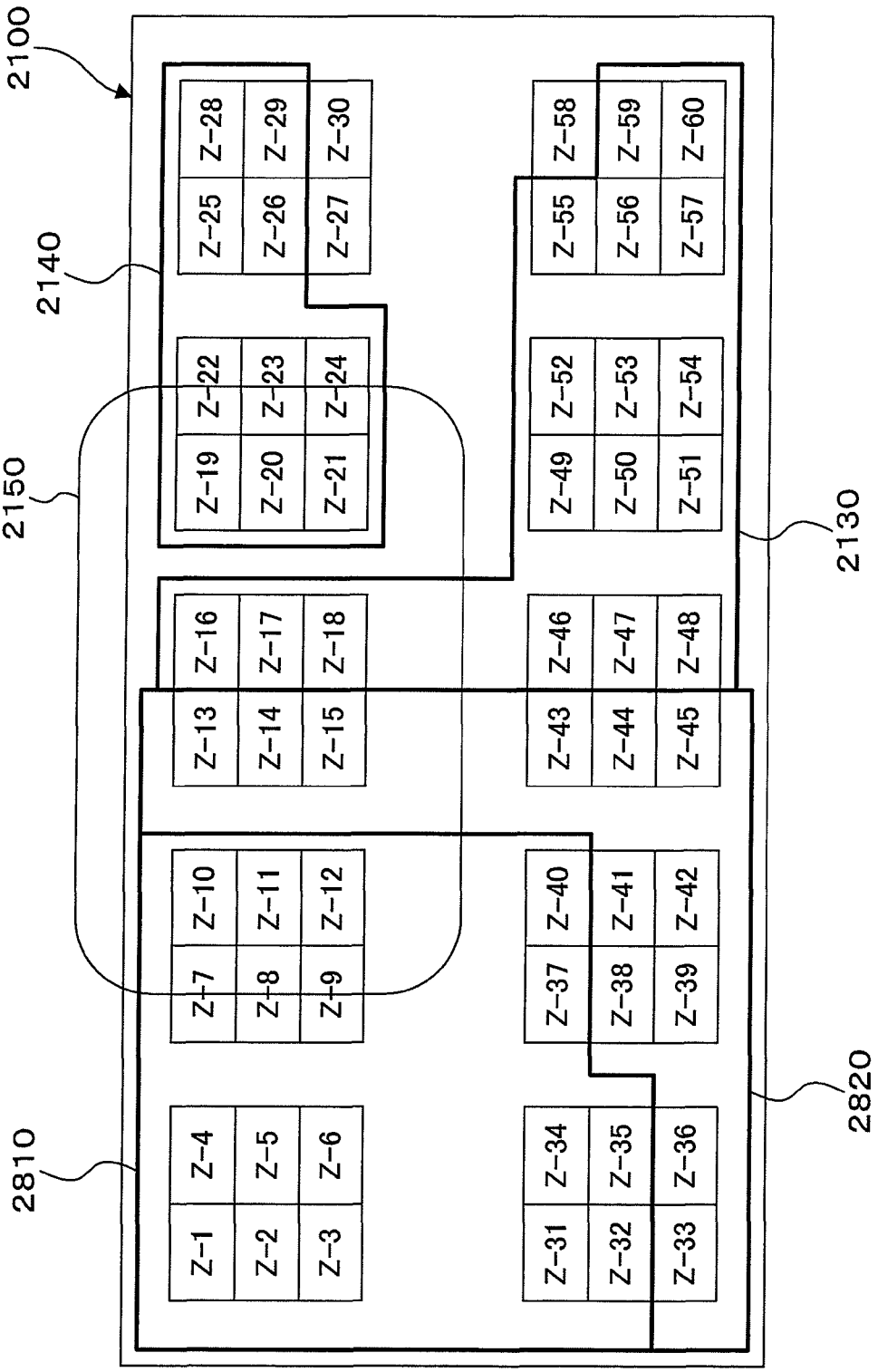
FIG. 28 is an explanatory view showing an example (2) of the processing according to the (2-3)th exemplary embodiment.

FIG. 28 is an explanatory view showing an example (2) of the processing according to the (2-3)th exemplary embodiment. When the seat occupation detection module 2580 detects a condition like the example of FIG. 27, the border change module 2270 performs allotment of a different combination so that the number of members is the same as the predicted number of members belonging to the organization and the selected seat is included. In the example of FIG. 28, the organization S-W 2110 illustrated in FIG. 21 is changed to an organization S-W 2810 after the change (a seat Z-40 is included, a seat Z-37 is further included, and seats Z-33 and Z-36 are deleted from the organization S-W 2110), and the organization S-X 2120 illustrated in FIG. 21 is changed to an organization S-X 2820 after the change (the seats Z-37 and Z-40 are deleted from the organization S-X 2120, and the seats Z-33 and Z-36 are included). In this change, the association between the organization information and the seat information is changed so that the seats of the members belonging to the same organization are not far apart.

Figure 29:
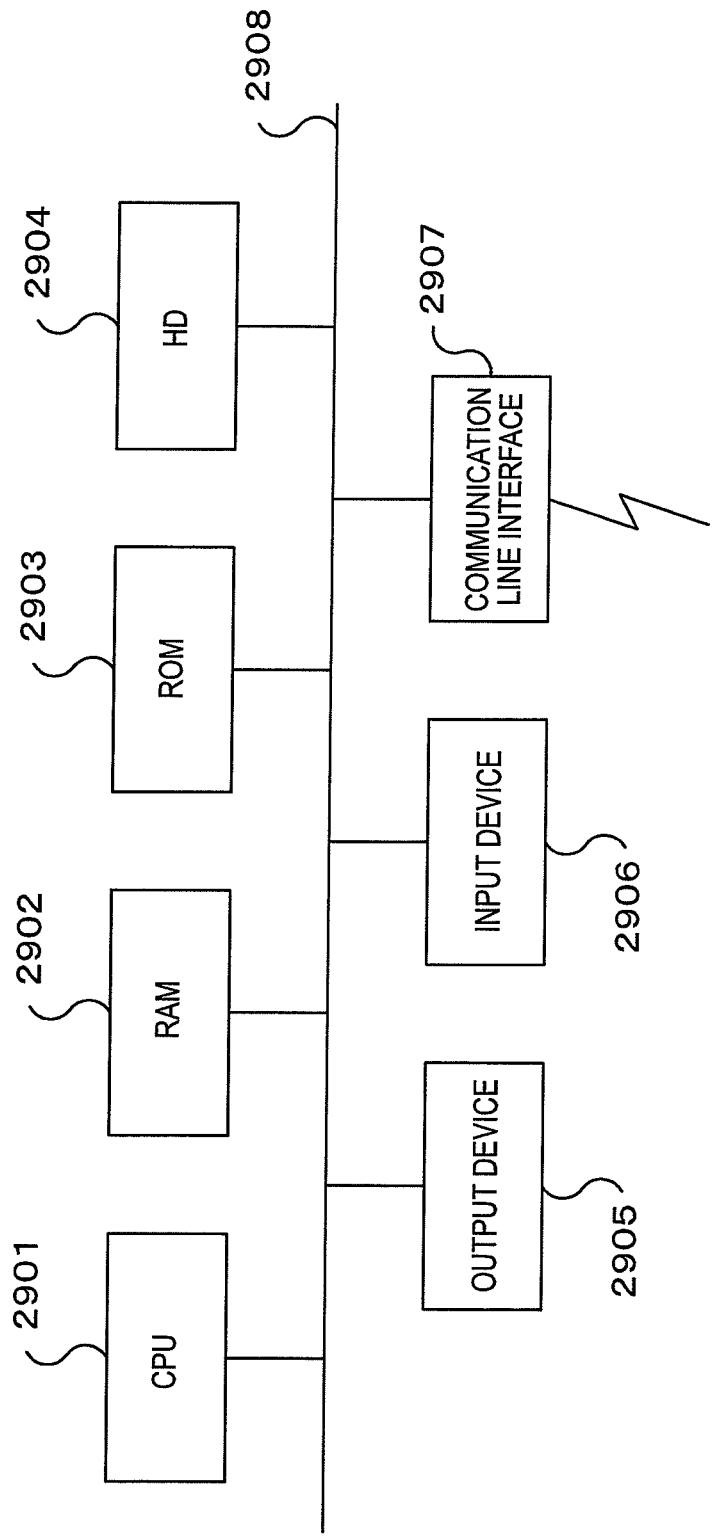
FIG. 29 is a block diagram showing an example of the hardware structure of a computer implementing the present exemplary embodiment.

The hardware structure of a computer executing a program as the above-described exemplary embodiment is, as illustrated in FIG. 29, a general computer, specifically, a personal computer, a computer capable of serving as a server, or the like. That is, as a concrete example, a CPU 2901 is used as the processor (arithmetic portion), and a RAM 2902, a ROM 2903 and an HD 2904 are used as storage devices. As the HD 2904, for example, a hard disk may be used. The computer includes: the CPU 2901 executing programs such as the vacancy information obtaining module 110, the area information obtaining module 120, the intra-area candidate seat information obtaining module 130, the adjacent candidate seat information obtaining module 140, the environmental load calculation module 150, the guide generation module 160, the output/notification module 170, the action pattern prediction module 920 and the environmental load evaluation module 930; the RAM 2902 storing these programs and data; the ROM 2903 storing a program for booting up this computer, and the like; the HD 2904 as an auxiliary storage device; an input device 2906 such as a keyboard and a mouse for inputting data; an output device 2905 such as a CRT or a liquid crystal display; a communication line interface 2907 such as a network interface card for connection with a communication network; and a bus 2908 for connecting these to exchange data. A plurality of such computers may be interconnected by a network.

Of the above-described exemplary embodiments, with respect to exemplary embodiments by computer programs, the system of this hardware structure is caused to read a computer program as software, and the software and the hardware resources cooperate to implement the above-described exemplary embodiments.

The hardware structure shown in FIG. 29 is a structure example, and the present exemplary embodiment is not limited to the structure shown in FIG. 29 but may adopt any structure that is capable of executing the modules described in the present exemplary embodiment. For example, some of the modules may be constructed of dedicated hardware (for example, an ASIC), some of the modules may be present in an external system and connected by a communication line, and further, a plurality of systems shown in FIG. 29 may be interconnected by a communication line so as to operate in cooperation with each other. Moreover, the present exemplary embodiment may be incorporated in a home information appliance, a copier, a fax, a scanner, a printer, a multifunction apparatus (an image processing apparatus having two or more of the scanner, printer, copier and fax functions), and the like.

The above-described exemplary embodiments may be combined (for example, applying a module of one exemplary embodiment to another exemplary embodiment and interchanging modules are included), and the technology described in Background Art may be adopted as the contents of the processings of the modules. For example, the candidate seat calculation module 100 of the first exemplary embodiment illustrated in FIG. 1 may be incorporated in the environmental load evaluation module 930 of the second exemplary embodiment (including the (2-1)th exemplary embodiment to the (2-3)th exemplary embodiment) illustrated in FIG. 9. More specifically, the candidate seat calculation module 100 illustrated in FIG. 1 may be incorporated in the recommended seat determination module 1540 of the (2-1)th exemplary embodiment to the (2-3)th exemplary embodiment illustrated in FIGS. 15, 22 and 25. The area information storage module 180 and the personal seat information storage module 190 of the first exemplary embodiment illustrated in FIG. 1 may be incorporated in the area information storage module 950 and the personal seat information storage module 960 of the second exemplary embodiment illustrated in FIG. 9.

The described programs may be provided in a state of being stored in a recording medium, or the programs may be provided through communication means. In that case, for example, the described programs may be regarded as an invention of a "computer-readable recording medium recording a program".

The "computer-readable recording medium recording a program" refers to a computer-readable recording medium recording a program which recording medium is used for purposes such as installing and executing a program and distributing a program.

Examples of the recording medium include: digital versatile disks (DVDs) such as "DVD-R, DVD-RW, DVD-RAM" which are standards developed by the DVD forum and "DVD+R, DVD+RW" which are standards developed by DVD+RW; compact disks (CDs) such as a read-only memory (CD-ROM), a CD-recordable (CD-R) and a CD-rewritable (CD-RW); a blue-ray disk (trademark); a magneto-optical disk (MO); a flexible disk (FD); a magnetic tape; a hard disk; a read only memory (ROM); an electrically erasable and rewritable read only memory (EEPROM); a flash memory; and a random access memory (RAM).

The programs or some of them may be stored or distributed in a state of being recorded in the recording medium. Moreover, they may be transmitted through communication by using a transmission medium such as: a wire network used for a local area network (LAN), a metropolitan area network (MAN), a wide-area network (WAN), the Internet, an intranet, an extranet, and the like; a wireless communication network; or a combination thereof, or may be conveyed on a carrier wave.

Further, the programs may be part of other programs, or may be recorded in a recording medium with another program. Moreover, they may be recorded in a state of being divided among a plurality of recording media. Moreover, they may be recorded in any form such as a compressed form or an encrypted form as long as they are restorable.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

EXPLANATION OF REFERENCE NUMERALS

100 Candidate seat calculation module
110 Vacancy information obtaining module
120 Area information obtaining module
130 Intra-area candidate seat information obtaining module
140 Adjacent candidate seat information obtaining module
150 Environmental load calculation module
160 Guide generation module
170 Output/notification module
180 Area information storage module
190 Personal seat information storage module
910 Action log data storage module
920 Action pattern prediction module
930 Environmental load evaluation module
940 Organization information storage module
950 Area information storage module
960 Personal seat information storage module
1510 Entrance and exit detection module
1520 Concerned organization information obtaining module
1530 Statistic calculation module
1540 Recommended seat determination module
2250 Person number calculation module
2260 Adjacent seat processing module
2270 Border change module
2580 Seat occupation detection module

What is claimed is:

1. An information processing apparatus comprising:
an entrance and exit detection module that detects a user's entrance and exit to and from a room;
an organization information obtaining module that, in a case where a user's entrance to a room is detected by the entrance and exit detection module, when the entering user is a user who enters the room first, obtains user information representative of a user belonging to an organization using the room by using organization user information storing, in a state of being associated with each other, organization information representative of the organization and the user information representative of the user belonging to the organization;
a user number calculation module that predicts the number of users of the organization using the room, based on information on a past action of the user represented by the user information obtained by the organization information obtaining module;
a seat determination module that associates with each other the organization information representative of the organization and seat information representative of seats in the room used by the organization based on the number of users calculated by the user number calculation module, and that determines, from among the associated seats, a seat for the user whose entrance is detected by the entrance and exit detection module;
a change module that, when a number of entering users belonging to the organization exceeds a number of users of the organization calculated by the user number calculation module, determines whether or not a vacant seat is present among seats adjacent to the seats represented by the seat information associated with the organization information obtained by the organization information obtaining module, and when the vacant seat is present, changes the seat information associated with the organization information; and
a presentation module that presents the seat determined by the seat determination module, to the user whose entrance is detected by the entrance and exit detection module.

2. The information processing apparatus according to claim 1, wherein the seat determination module includes:
a vacant seat information obtaining unit that obtains seat information representative of the vacant seat by using seat vacancy information storing, in a state of being associated with each other, the seat information representative of the seats and vacant seat information representative of whether the seats are vacant or not;
an area information obtaining unit that obtains area information representative of an area where a lighting apparatus or an air conditioning apparatus is used, by using area condition information storing, in a state of being associated with each other, the area information representative of an area where a lighting apparatus or an air conditioning apparatus is adjustable and use condition information representative of a use condition of the lighting apparatus or the air conditioning apparatus in the area; and
a determination unit that determines whether or not the vacant seat represented by the seat information obtained by the vacant seat information obtaining unit is within the area represented by the area information obtained by the area information obtaining unit,
wherein when the determination unit determines that the vacant seat represented by the seat information obtained by the vacant seat information obtaining unit is within the area represented by the area information obtained by the area information obtaining unit, the presentation module presents the vacant seat to the user whose entrance is detected by the entrance and exit detection module.

3. The information processing apparatus according to claim 1 further comprising an intra-adjacent-area vacant seat information obtaining module that, when the determination unit determines that the vacant seat represented by the seat information obtained by the vacant seat information obtaining unit is not within the area represented by the area information obtained by the area information obtaining unit, obtains seat information representative of a vacant seat within an area adjacent to the area represented by the area information obtained by the area information obtaining unit, wherein the presentation module presents to the user the vacant seat represented by the seat information obtained by the intra-adjacent-area vacant seat information obtaining module.

4. The information processing apparatus according to claim 1, wherein in a case where a user's entrance to a room is detected by the entrance and exit detection module, when the entering user is not a user entering the room first, the organization information obtaining module obtains organization information of an organization to which the user whose entrance is detected by the entrance and exit detection module belong, by using the organization user information, and the seat determination module determines a seat for the user whose entrance is detected by the entrance and exit detection module, from among the seats represented by the seat information associated with the organization information obtained by the organization information obtaining module.

5. The information processing apparatus according to claim 1 further comprising a seat occupation detection module that detects a seat occupied by a user, wherein when the seat detected by the seat occupation detection module is different from the seat presented by the presentation module, the change module obtains the organization information representative of the organization to which the user of the seat belongs, by using the organization user information, and changes the seat information associated with the organization information.

6. The information processing apparatus according to claim 1, wherein the seat determination module determines a seat for the entering user by comparing information on the entering user's past action and the information on the past action of the user belonging to the organization to which the entering user belongs which user is represented by the user information obtained by the organization information obtaining module.

7. The information processing apparatus according to claim 1, wherein the seat determination module associates with each other the organization information representative of the organization and the seat information representative of a seat in the room used by the organization by comparing information on the past action of the user belonging to the organization to which the entering user belongs which user is represented by the user information obtained by the organization information obtaining module, and information on a past action of a user belonging to an organization different from the organization.

8. A computer readable medium storing a program causing a computer to execute a process for information processing, the process comprising:

detecting a user's entrance and exit to and from a room;

in a case where a user's entrance to a room is detected by an entrance and exit detection module, when the entering user is a user who enters the room first, obtaining user information representative of a user belonging to an organization using the room by using organization user information storing, in a state of being associated with each other, organization information representative of the organization and the user information representative of the user belonging to the organization;

predicting the number of users of the organization using the room, based on information on a past action of the user represented by the user information obtained in the detecting step;

associating with each other the organization information representative of the organization and seat information representative of seats in the room used by the organization based on the number of users calculated in the calculating step;

determining, from among the associated seats, a seat for the user whose entrance is detected in the detection step;

determining whether or not a vacant seat is present among seats adjacent to the seats represented by the seat information associated with the organization information when a number of entering users belonging to the organization exceeds a number of users of the organization;

changing the seat information associated with the organization information when the vacant seat is present; and presenting the seat determined in the determining step, to the user whose entrance is detected in the detecting step.

9. The information processing apparatus according to claim 2, wherein the area where the lighting apparatus or the air conditioning apparatus is adjustable is an area where the lighting apparatus or the air conditioning apparatus is adjusted without affecting lighting apparatuses and air conditioning apparatuses in other areas.

10. The information processing apparatus according to claim 2, wherein the lighting apparatus or the air conditioning apparatus is a lighting apparatus which is adjustable with respect to at least one of brightness and color.

11. The information processing apparatus according to claim 2, wherein the lighting apparatus or the air conditioning apparatus is an air conditioning apparatus which is adjustable with respect to at least one of temperature and air volume.

12. The information processing apparatus according to claim 2, wherein an environmental load is reduced by using local air conditioning or lighting in accordance with the area where the lighting apparatus or the air conditioning apparatus is adjustable.

* * * * *